(12) United States Patent
Tanizaki et al.

(10) Patent No.: US 10,583,664 B2
(45) Date of Patent: Mar. 10, 2020

(54) HOLLOW FIBER MEMBRANE MODULE

(71) Applicant: MITSUBISHI CHEMICAL CLEANSUI CORPORATION, Shinagawa-ku (JP)

(72) Inventors: Yoshie Tanizaki, Tokyo (JP); Hiroyuki Okazaki, Tokyo (JP)

(73) Assignee: MITSUBISHI CHEMICAL CLEANSUI CORPORATION, Shinagawa-ku (JP)

(*) Notice: Subject to any disclaimer, the term of this patent is extended or adjusted under 35 U.S.C. 154(b) by 0 days.

(21) Appl. No.: 16/183,286

(22) Filed: Nov. 7, 2018

(65) Prior Publication Data

US 2019/0070862 A1   Mar. 7, 2019

Related U.S. Application Data

(63) Continuation of application No. PCT/JP2017/017676, filed on May 10, 2017.

(30) Foreign Application Priority Data

May 11, 2016 (JP) ................................. 2016-095596

(51) Int. Cl.
*B41J 2/19* (2006.01)
*B01D 63/02* (2006.01)
(Continued)

(52) U.S. Cl.
CPC .......... *B41J 2/19* (2013.01); *B01D 19/0031* (2013.01); *B01D 61/00* (2013.01); *B01D 63/02* (2013.01);
(Continued)

(58) Field of Classification Search
CPC . B41J 2/19; B41J 2/175; B41J 2/17556; B41J 2002/14169; B41J 2202/07;
(Continued)

(56) References Cited

U.S. PATENT DOCUMENTS 4,289,623 A   9/1981  Lee
4,923,679 A   5/1990  Fukasawa et al.
(Continued)

FOREIGN PATENT DOCUMENTS

GB   2 011 274 A   7/1979
JP   50-83353      7/1975
(Continued)

OTHER PUBLICATIONS

International Search Report dated Jun. 13, 2017 in PCT/JP2017/017676, filed on May 10, 2017 (with English Translation).
(Continued)

*Primary Examiner* — Juanita D Jackson
(74) *Attorney, Agent, or Firm* — Oblon, McClelland, Maier & Neustadt, L.L.P.

(57) ABSTRACT

Disclosed herein is a hollow fiber membrane module provided with a hollow fiber membrane bundle, a case in which the hollow fiber membrane bundle is contained, a fixation part which affixes the hollow fiber membrane bundle within the case and divides the space inside the case into a first space that is outside the hollow fiber membranes and a second space that is in communication with the insides of the hollow fiber membranes, and a partition plate which divides the first space into a first region and a second region.

16 Claims, 10 Drawing Sheets

(51) Int. Cl.
*B41J 2/175* (2006.01)
*B01D 61/00* (2006.01)
*B01D 19/00* (2006.01)
*B01D 63/04* (2006.01)
*B01D 69/08* (2006.01)
*B01D 69/12* (2006.01)

(52) U.S. Cl.
CPC .......... *B01D 63/024* (2013.01); *B01D 63/04* (2013.01); *B01D 69/08* (2013.01); *B01D 69/12* (2013.01); *B41J 2/175* (2013.01); *B01D 2313/14* (2013.01)

(58) Field of Classification Search
CPC .... B01D 19/0031; B01D 61/00; B01D 63/02; B01D 63/024; B01D 63/01; B01D 69/08; B01D 69/12
See application file for complete search history.

(56) References Cited

U.S. PATENT DOCUMENTS

| | | |
|---|---|---|
| 5,176,725 A | 1/1993 | Puri et al. |
| 6,210,464 B1 | 4/2001 | Nakanishi et al. |
| 6,402,818 B1 | 6/2002 | Sengupta |
| 6,447,679 B1* | 9/2002 | Watari et al. ............. B41J 2/19 |
| 2002/0134235 A1 | 9/2002 | Sengupta et al. |
| 2007/0278145 A1 | 12/2007 | Taylor et al. |
| 2011/0074842 A1* | 3/2011 | Hyakudome et al. ...................... B41J 2/17506 |
| 2016/0158670 A1 | 6/2016 | Tanizaki et al. |

FOREIGN PATENT DOCUMENTS

| | | |
|---|---|---|
| JP | 54-92580 | 7/1979 |
| JP | 62-190602 U | 12/1987 |
| JP | 2-59016 | 2/1990 |
| JP | 7-68103 | 3/1995 |
| JP | 11-000394 A | 1/1999 |
| JP | 11-009685 A | 1/1999 |
| JP | 2000-262838 | 9/2000 |
| JP | 2001-129368 | 5/2001 |
| JP | 2005-40675 | 2/2005 |
| JP | 2005-305432 | 11/2005 |
| JP | 2008-30023 | 2/2008 |
| JP | 4237534 B2 | 3/2009 |
| JP | 2012-161793 | 8/2012 |
| KR | 10-2014-0125101 A | 10/2014 |
| WO | WO 2015/012293 A1 | 1/2015 |

OTHER PUBLICATIONS

Office Action dated Jul. 3, 2018 in Japanese Application 2017-529844 (with English Translation).
Search Report dated Jan. 7, 2020, in European Patent Application No. 17796178.6, filed May 10, 2017.

* cited by examiner

HOLLOW FIBER MEMBRANE MODULE

This application is a continuation application of International Application No. PCT/JP2017/017676, filed on May 10, 2017, which claims the benefit of priority of the prior Japanese Patent Application No. 2016-095596, filed in Japan on May 11, 2016, the entire content of which is incorporated herein by reference.

TECHNICAL FIELD

The present invention relates to a hollow fiber membrane module for removing a gas from a liquid to be processed or supplying a gas to the liquid to be processed.

BACKGROUND ART

A hollow fiber membrane module is used for removing a dissolved gas (degassing) from a liquid or supplying a gas (gas supply) to the liquid, in addition to filtering the liquid. For example, there is known a degassing method of removing oxygen or the like from ink for an ink jet printer by using a hollow fiber membrane module.

For example, the following devices are proposed as a hollow fiber membrane module for degassing or gas supply.

(1) A membrane contactor having a configuration in which membrane mats that are each formed by a plurality of arranged hollow-fiber members are stacked in a housing such that a length direction of the hollow-fiber members is orthogonal to a flowing direction of a liquid to be processed, and the membrane mat is fixed in the housing with a potting material that partitions an inside of the housing into an internal chamber and an external chamber (Patent Literature 1).

(2) A membrane contact device including a shell, a circular cylindrical perforated core that is inserted into the shell, a hollow fiber that is disposed in parallel with the perforated core so as to surround the perforated core, and a tube sheet that affixes end portions of the hollow fiber and partitions an inside of the shell into a shell space and a headspace (Patent Literature 2).

(3) A membrane degassing device including a liquid-to-be-processed container, a plurality of hollow fiber degassing membranes accommodated in the liquid-to-be-processed container, and an adhesion portion and a partition that affix end portions of the hollow fiber degassing membranes in the liquid-to-be-processed container and partition an inside of the liquid-to-be-processed container into a liquid-to-be-processed chamber and a pressure-reducing chamber (Patent Literature 3).

CITATION LIST

Patent Literature

Patent Literature 1: JP 2008-30023 A
Patent Literature 2: JP 2012-161793 A
Patent Literature 3: JP 7-68103 A

SUMMARY OF THE INVENTION

Problem to be Solved by the Invention

The membrane contactor in (1), the membrane contact device in (2), and the membrane degassing device in (3) have the following problems.

Since the liquid to be processed flows in a right-angled or obliquely traversing direction of a hollow fiber membrane, a pressure loss increases, and thus it is not possible to increase a flow volume of the liquid to be processed.

Since a short pass is formed, a flow path length is shortened, and a contact time with the hollow fiber membranes is shortened. In addition, since a dead space, in which sufficient liquid to be processed does not flow, is also formed when the short pass is formed, it is not possible to effectively use the hollow fiber membrane. Therefore, it is not possible to perform sufficient degassing from or gas supply to the liquid to be processed.

According to the invention, there is provided a hollow fiber membrane module that is capable of decreasing a pressure loss when a liquid to be processed flows and performing sufficient degassing from or gas supply to the liquid to be processed.

Means for Solving Problem

The invention employs the following aspects.

[1] A hollow fiber membrane module for removing a gas from a liquid to be processed and supplying a gas to the liquid to be processed, the module including: a hollow fiber membrane bundle formed by a plurality of arranged hollow fiber membranes; a case in which the hollow fiber membrane bundle is housed; a fixation part that affixes an opening end portion of each of the hollow fiber membranes in the case in a state of maintaining an opening and partitions a space in the case in a liquid-tight manner into a first space on an outer side of the hollow fiber membranes and a second space that communicates with an inner side of each of the hollow fiber membranes; and (n−1) partition plates provided in a length direction of the hollow fiber membranes so as to divide the first space into n regions (here, n is an integer of 2 or higher), in which the case is provided with an inlet for the liquid to be processed in the first region and an outlet for a processed liquid in the n-th region, in which the i-th partition plate (here, i is an integer from 1 to n−1) is provided with an inlet for the liquid to be processed in the (i+1)-th region, the inlet serving also as an outlet for the liquid to be processed in the i-th region, and in which, when X represents a length of each of the regions in the length direction of the hollow fiber membranes, the inlet for the liquid to be processed is formed in a range from an end of the region on an upstream side to $\frac{1}{3} \times X$ on a downstream side in a flowing direction of the liquid to be processed, and the outlet for the liquid to be processed and the outlet for the processed liquid are formed in a range from the end of the region on the downstream side to $\frac{1}{3} \times X$ on the upstream side in the flowing direction of the liquid to be processed.

[2] The hollow fiber membrane module according to [1], in which the flowing direction of the liquid to be processed is parallel to a longitudinal direction of the hollow fiber membranes.

[3] The hollow fiber membrane module according to [1] or [2], in which the hollow fiber membrane bundle has an end portion that is not affixed, on an opposite side to the opening end portion.

[4] The hollow fiber membrane module according to any one of [1] to [3], in which a filling rate of the hollow fiber membranes in a cross section obtained by being cut perpendicularly to the longitudinal direction of the hollow fiber membrane bundle is 20 to 50% by area in terms of 100% by area of a sectional area of a space when the case is cut perpendicularly to the longitudinal direction.

[5] The hollow fiber membrane module according to any one of [1] to [4], in which at least one selected from the group consisting of the inlet for the liquid to be processed and the outlet for the processed liquid, which are formed in the case, is formed on a side surface of the case.

[6] The hollow fiber membrane module according to any one of [1] to [5], further including: a lid body that covers the opening of the case on a side on which the hollow fiber membrane bundle is not affixed, in which at least one selected from the group consisting of the inlet for the liquid to be processed and the outlet for the processed liquid is formed in the lid body.

[7] The hollow fiber membrane module according to any one of [1] to [6], in which an area of the inlet for the liquid to be processed and an area of the outlet for the liquid to be processed, which are formed in the partition plate, are equal to or smaller than a sectional area obtained when a space divided and formed by the partition plate is cut perpendicularly to the longitudinal direction.

[8] The hollow fiber membrane module according to any one of [1] to [7], further including a blocking portion that blocks a flow of the liquid to be processed in a gap between the hollow fiber membrane bundle and the case.

[9] The hollow fiber membrane module according to any one of [1] to [8], in which the hollow fiber membrane bundle is bent into a U shape, and the hollow fiber membrane bundle has substantially the same length.

[10] The hollow fiber membrane module according to any one of [1] to [9], in which the hollow fiber membrane bundle has a restriction fiber string that extends in a direction orthogonal to the length direction of the hollow fiber membranes while connecting the hollow fiber membranes.

[11] The hollow fiber membrane module according to any one of [1] to [10], in which the hollow fiber membranes are combined membranes that are each provided with a homogeneous layer having gas permeability and a porous support layer which supports the homogeneous layer.

[12] The hollow fiber membrane module according to any one of [1] to [11], in which an outer diameter of each of the hollow fiber membranes is 350 μm or smaller.

[13] The hollow fiber membrane module according to any one of [1] to [12], in which the hollow fiber membrane has fracture strength of 0.5 N/fil or higher and fracture elongation of 50% or higher.

[14] The hollow fiber membrane module according to any one of [1] to [13], in which the case has a circular cylindrical shape or an angled shape.

[15] An ink jet printer including: a printing ink container; a print head; pressure reducing means; and a hollow fiber membrane module, in which at least one hollow fiber membrane module according to any one of [1] to [14] is provided at any position between the printing ink container and the print head.

[16] The ink jet printer according to [15], further including: liquid feeding means.

Effect of the Invention

According to a hollow fiber membrane module of the invention, it is possible to decrease a pressure loss when a liquid to be processed flows and to perform sufficient degassing from or gas supply to the liquid to be processed.

MODE(S) FOR CARRYING OUT THE INVENTION

Sequential orders assigned to partition plates and regions in this specification and claims are numbers assigned in order from an upstream side of a flow of a liquid to be processed.

The "liquid to be processed" is a liquid before passing through a hollow fiber membrane and a liquid that is in contact with a hollow fiber membrane in a case.

A "processed liquid" is a liquid after passing through the hollow fiber membrane module.

That "an inlet (outlet) for the liquid to be processed is formed in a range from an end of a region on an upstream (downstream) side to ⅓×X on the downstream (upstream) side in a flowing direction of the liquid to be processed" means that an entire opening portion of the inlet (outlet) of the liquid to be processed is present within the above-described range.

Scale ratios in FIGS. 1 to 6 include a scale ratio different from an actual scale ratio, for convenience of the description. In addition, in FIGS. 2 to 6, the same letters or numerals are assigned to the same constituent elements as those in FIG. 1, and thus the description thereof is omitted.

<<Hollow Fiber Membrane Module>>
<First Embodiment>

Figure 1:
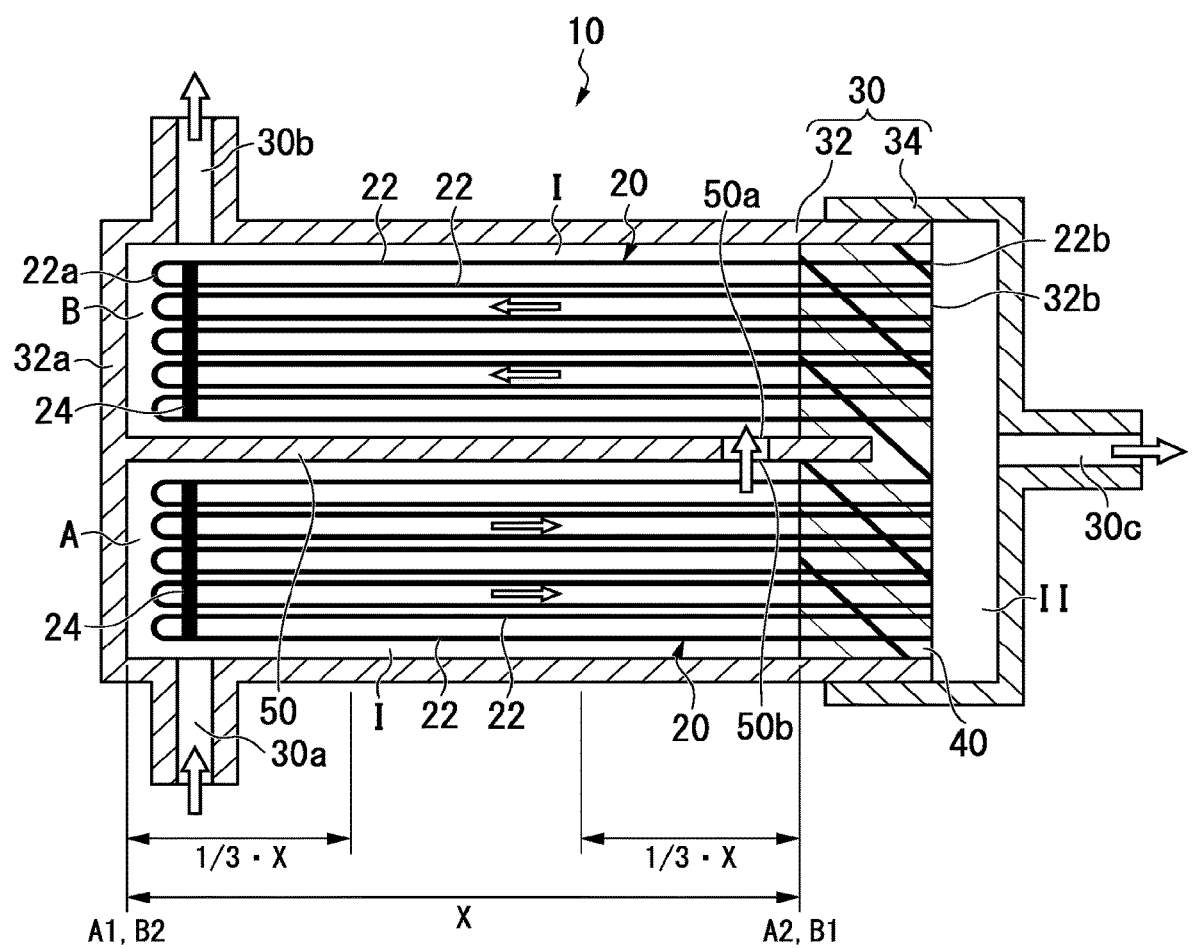
FIG. 1 is a sectional view illustrating a first embodiment of a hollow fiber membrane module of the invention.

FIG. 1 is a sectional view illustrating a first embodiment of a hollow fiber membrane module of the invention.

A hollow fiber membrane module 10 includes a hollow fiber membrane bundle 20, a case 30, a fixation part 40, and a partition plate 50.

(Hollow Fiber Membrane Bundle)

The hollow fiber membrane bundle 20 is bent into a U shape and is formed by a plurality of hollow fiber membranes 22 which are arranged to have substantially the same length direction in portions thereof other than bending portions 22a.

In the hollow fiber membrane bundle 20, the bending portions 22a of the hollow fiber membranes 22 are arranged to be disposed substantially at the same position.

In the hollow fiber membrane bundle 20, opening end portions 22b at both ends of the hollow fiber membrane 22 are arranged to be disposed substantially at the same position.

The hollow fiber membrane bundle 20 has a restriction fiber string 24 that extends in a direction orthogonal to the length direction of the hollow fiber membranes 22 while connecting the hollow fiber membranes 22 in the vicinity of the bending portion 22a.

In terms of obtaining good degassing performance or gas supply performance, the hollow fiber membranes 22 are, preferably, combined membranes that are each provided with a homogeneous layer having gas permeability and a porous support layer which supports the homogeneous layer. In particular, it is more preferable to use a composite hollow fiber membrane having a three-layer structure with a homogeneous layer sandwiched between porous support layers from both sides.

Examples of materials of the hollow fiber membrane 22 include polyolefin (polyethylene, polypropylene, poly(4-methylpentene-1), or the like), fluororesin (polytetrafluoroethylene, polyvinylidene fluoride, an ethylene tetrafluoroethylene copolymer, or the like), polystyrene resin, polysulfone-based resin, polyether ketone, polyether ether ketone, polycarbonate, cellulose derivative, polyamide, polyester, polymethacrylate, polyacrylate, a resin including one or more thereof, or the like. In addition, the materials thereof may include a copolymer of the resins or a material obtained by introducing a substituent to a part thereof. In consideration of chemical resistance or an environmental burden, it is preferable to use the polyolefin. In consideration of handling and a reduction in elution to the liquid to be processed when the fixation part is formed, it is preferable to use polyethylene or polypropylene.

For example, the restriction fiber string 24 is a chain-stitched (chain-knitted) fiber string or the like. In a manufacturing method of the hollow fiber membrane module 10 to be described below, the restriction fiber strings 24 are warps that are provided at both side portions of a Raschel knitted fabric such that a shift of the hollow fiber membranes 22, which are warps in the Raschel knitted fabric, is suppressed when the Raschel knitted fabric, which is a hollow fiber membrane sheet-shaped object as a precursor of the hollow fiber membrane bundle 20, is prepared. A multifilament yarn or a spun yarn made of synthetic fibers such as polyester fibers having a water-resistant property is used as the restriction fiber string 24.

An outer diameter of the hollow fiber membrane 22 is, preferably, 350 μm and, more preferably, 150 to 350 μm. Within the above-described numerical value range, it is possible to effectively form a flow path between the hollow fiber membranes in the case 30.

Fracture strength of the hollow fiber membrane 22 is, preferably, 0.5 N/fil or higher and, more preferably, 1.5 to 10 N/fil. Within the above-described numerical value range, suitable handling is achieved during manufacturing, and it is also preferable to have the range regarding durability. Here, a unit of "N/fil" indicates that strength necessary to fracture one hollow porous membrane (one filament) is described in a newton (N). The fracture strength represents a measured value by using a Tensilon tensile tester. Specifically, one hollow porous membrane is pinched by a chuck unit of the tensile tester and is stretched at a speed of 100 mm/min in this state such that a length of the membrane becomes 10 cm (100 mm), and a load (N) is measured when the hollow porous membrane is fractured. The measurement is performed five times, and an average value becomes the fracture strength.

The fracture strength of the hollow fiber membrane 22 is, preferably, 50% and, more preferably, 150 to 500%. Within the above-described numerical value range, suitable handling is achieved during manufacturing, and it is also preferable to have the range regarding durability. It is possible to measure fracture elongation by the same method of the fracture strength.

(Case)

The case 30 is a member that houses the hollow fiber membrane bundle 20.

An inside of the case 30 is sealed in a liquid-tight or airtight manner such that the liquid to be processed or a gas in the inside does not leak out to the outside, except for an inlet 30a for the liquid to be processed, an outlet 30b for a processed liquid, and an gas inlet/outlet 30c.

The case 30 includes a case main body 32 having a bottomed box shape, which houses the hollow fiber membrane bundle 20 such that the bending portion 22a of the hollow fiber membrane 22 is disposed on a side of a head portion 32a and a side of the opening end portion 22b of the hollow fiber membrane 22 is disposed on a side of a case opening 32b, and a lid body 34 that covers the case opening 32b of the case main body 32 so as to form a space between the case opening 32b and the lid body. The case main body 32 and the lid body 34 are joined to each other by screwing, fusion-bonding, adhesion, or the like.

The case main body 32 is provided with the inlet 30a for the liquid to be processed, which communicates with an inside of the case main body 32, at a position of a side wall which is close to the head portion 32a, and the outlet 30b for the processed liquid, which communicates with the inside of the case main body 32, at a position of a side wall that is opposite to the side wall provided with the inlet 30a for the liquid to be processed, the position being close to the head portion 32a.

The lid body 34 is provided with the gas inlet/outlet 30c that communicates with an inside of the lid body 34.

The case may have a circular cylindrical shape or an angled shape.

For example, a material having mechanical strength and durability is used as a material of the case 30, and examples thereof include polycarbonate, polysulfone, polyolefin, polyvinyl chloride, acrylic resin, ABS resin, modified polyphenylene ether, or the like.

A filling rate of the hollow fiber membranes 22 when the case is cut perpendicularly to a longitudinal direction of the hollow fiber membrane bundle 20 is, preferably, 20 to 50% by area and, more preferably, 25 to 45% by area in terms of 100% by area of a sectional area of a space when the case 30 is cut perpendicularly to the longitudinal direction. The filling rate is within the above-described range, and thereby it is possible to effectively form a flow path between the hollow fiber membranes.

(Fixation Part)

The fixation part 40 affixes an opening end portion 22b of the hollow fiber membrane 22 in the case 30 in a state of maintaining an opening thereof and partitions a space in the case 30 in a liquid-tight manner into a first space I on an outer side of the hollow fiber membrane 22 and a second space II that communicates with an inner side of the hollow fiber membrane 22.

The fixation part 40 affixes the opening end portion 22b of the hollow fiber membrane 20 and the vicinity thereof to the case opening 32b of the case main body 32 and the vicinity thereof such that the bending portion 22a of the hollow fiber membrane 22 is disposed on the side of the head portion 32a of the case main body 32 and the side of the opening end portion 22b of the hollow fiber membrane 22 is disposed on the side of the case opening 32b of the case main body 32.

The first space I is a space surrounded by the case main body 32 and the fixation part 40 (excluding the hollow fiber membranes 22). The first space I communicates with the inlet 30a for the liquid to be processed and the outlet 30b for the processed liquid and is a flow path of the liquid to be processed. In the first space I, the hollow fiber membrane bundle 20 is present, and the liquid to be processed comes into contact with the hollow fiber membrane 22.

The second space II is a space surrounded by the lid body 34 and the fixation part 40. The second space II communicates with the gas inlet/outlet 30c and is a flow path of gas.

It is preferable that the fixation part 40 affix the hollow fiber membranes 22 on the side of the opening end portion 22b and do not affix an end portion (hereinafter, also referred to as a free end) on an opposite side to the opening end portion 22b.

A potting material, which is a material of the fixation part 40, includes thermosetting resin (polyurethane or epoxy resin) or thermoplastic resin (polyolefin, fluororesin, or the like).

(Partition Plate)

The partition plate 50 is one plate provided in the length direction of the hollow fiber membranes 22 so as to divide the first space I into two regions of a first region A that communicates with the inlet 30a for the liquid to be processed and a second region B that communicates with the outlet 30b for the processed liquid.

The partition plate 50 seals the regions in a liquid-tight manner such that the liquid to be processed does not leak out to an adjacent region, except for an inlet 50a for the liquid to be processed, which also serves as an outlet 50b for the liquid to be processed.

The partition plate 50 is provided in the case main body 32 such that a first end portion of the partition plate is integrally joined to the head portion 32a of the case main body 32, a second end portion thereof is buried in the fixation part 40, and side portions thereof are integrally joined to the side walls of the case main body 32.

The partition plate 50 distributes about a half of the hollow fiber membranes 22 constituting the hollow fiber membrane bundle 20 in the first region A and distributes about a half of the remaining hollow fiber membranes 22 constituting the hollow fiber membrane bundle 20 in the second region B. The partition plate 50 is provided with the inlet 50a for the liquid to be processed in the second region B, which also serves as the outlet 50b for the liquid to be processed in the first region A, at a position close to the fixation part 40.

It is preferable that an area of the inlet 50a for the liquid to be processed and an area of the outlet 50b for the liquid to be processed, which are formed in the partition plate 50, be equal to or smaller than a sectional area obtained when a space (for example, the first space) divided and formed by the partition plate 50 is cut perpendicularly to the longitudinal direction. Specifically, it is preferable that the area of the inlet 50a for the liquid to be processed and the area of the outlet 50b for the liquid to be processed be ⅕ to 1 time of the sectional area obtained when the space divided and formed by the partition plate 50 is cut perpendicularly to the longitudinal direction. In such a configuration, the liquid to be processed can more uniformly and effectively come into contact with the hollow fiber membrane.

For example, a material having mechanical strength and durability is used as a material of the partition plate 50, and examples thereof include polycarbonate, polysulfone, polyolefin, polyvinyl chloride, acrylic resin, ABS resin, modified polyphenylene ether, or the like.

(Inlet for Liquid to Be Processed and Outlet for Liquid to Be Processed)

The case main body 32 of the case 30 is provided with the inlet 30a for the liquid to be processed in the first region A and the outlet 30b for the processed liquid in the second region B.

Only one partition plate 50 is provided with the inlet 50a for the liquid to be processed in the second region B, which also serves as the outlet 50b for the liquid to be processed in the first region A.

When X represents a length of the first region A in the length direction of the hollow fiber membranes 22, the inlet 30a for the liquid to be processed is formed in a range from an upstream end A1 of the first region A on an upstream side to ⅓×X on a downstream side in a flowing direction of the liquid to be processed. In addition, the outlet 50b for the liquid to be processed is formed in a range from a downstream end A2 of the first region A on the downstream side to ⅓×X on the upstream side in the flowing direction of the liquid to be processed.

When X represents a length of the second region B in the length direction of the hollow fiber membranes 22, the inlet 50a for the liquid to be processed is formed in a range from an upstream end B1 of the second region B on the upstream side to ⅓×X on the downstream side in the flowing direction of the liquid to be processed. In addition, the outlet 30b for the processed liquid is formed in a range from a downstream end B2 of the second region B on the downstream side to ⅓×X on the upstream side in the flowing direction of the liquid to be processed.

The inlets for the liquid to be processed in the regions are formed in the range from ends of the regions on the upstream side to ⅓×X (preferably, ¼×X) on the downstream side in the flowing direction of the liquid to be processed, and the outlets for the liquid to be processed in the regions are formed in the range from ends of the regions on the downstream side to ⅓×X (preferably, ¼×X) on the upstream side in the flowing direction of the liquid to be processed. In this manner, long flow paths are secured in the regions.

(Manufacturing Method for Hollow Fiber Membrane Module)

It is possible to manufacture the hollow fiber membrane module 10 of the first embodiment by a known manufacturing method. For example, it is possible to manufacture the hollow fiber membrane module in the following procedure.

While the hollow fiber membrane, which is a weft, is folded to have a preset length, folded portions on both sides are connected with a chain-stitched warp by using a Raschel knitting machine, and thereby a hollow fiber membrane sheet-shaped object of the Raschel knitted fabric is manufactured.

While the hollow fiber membrane sheet-shaped object is folded down in each of the first region A and a second region B of the case main body 32 in which the partition plate 50 that is integrally joined to the head portion 32a and the side wall is provided, the hollow fiber membranes 22 are inserted to be parallel to the partition plate 50.

A liquid-phase potting material is supplied to the case opening 32b of the case main body 32 and the vicinity thereof and is hardened or solidified, and thereby the fixation part 40 is formed.

An end portion of the fixation part 40 on the side of the case opening 32b of the case main body 32 is cut at each of the end portion of the case main body 32 and a folded end portion of the hollow fiber membrane sheet-shaped object, and thereby the opening end portions 22b of the hollow fiber membranes 22 are formed.

The lid body 34 is joined to the case main body so as to cover the case opening 32b of the case main body 32 such that the case 30 is completed, and the hollow fiber membrane module 10 is obtained.

(Degassing Method or Gas Supply Method)

Degassing from or gas supply to the liquid to be processed by using the hollow fiber membrane module 10 of the first embodiment can be performed as follows.

A vacuum pump (not illustrated) is connected to the gas inlet/outlet 30c of the lid body 34 of the case 30.

A squeeze pump (not illustrated) is connected to the inlet 30a for the liquid to be processed of the case main body 32 of the case 30, or a suction pump (not illustrated) is connected to the outlet 30b for the processed liquid.

The vacuum pump is operated such that a pressure in the second space II in the lid body 34 is in a pressure reduction state, and a pressure in the hollow fiber membrane 22 of the hollow fiber membrane bundle 20, which communicates with the second space II, is in a pressure reduction state.

The squeeze pump or the suction pump is operated such that the liquid to be processed is supplied to the first region A of the first space I in the case main body 32 from the inlet 30a for the liquid to be processed.

The liquid to be processed, which has supplied to the first region A, flows in the first region A to be parallel to the length direction of the hollow fiber membranes 22 from a side of the upstream end A1 to a side of the downstream end A2.

The liquid to be processed, which has reached the side of the downstream end A2 of the first region A, moves to the second region B of the first space I in the case main body 32 through the inlet 50a for the liquid to be processed in the second region B, which also serves as the outlet 50b for the liquid to be processed in the first region A.

The liquid to be processed, which has moved to the second region B, flows in the second region B in the length direction of the hollow fiber membranes 22 from a side of the upstream end B1 to a side of the downstream end B2. In this case, it is preferable that the flowing direction of the liquid to be processed be parallel to the longitudinal direction of the hollow fiber membrane 22.

The liquid to be processed, which has reached the side of the downstream end B2 of the second region B, is discharged out of the case main body 32 through the outlet 30b for the processed liquid in the second region B.

While the liquid to be processed flows in the first region A and the second region B, the liquid to be processed comes into contact with an outer side of the hollow fiber membrane 22. A dissolved gas in the liquid to be processed, which comes into contact with the outer side of the hollow fiber membrane 22, moves to an inner side having the pressure in the pressure reduction state from the outer side of the hollow fiber membrane 22. As described above, the dissolved gas is removed from the liquid to be processed.

Note that a pressure pump is connected to the gas inlet/outlet 30c of the lid body 34 of the case 30, instead of the vacuum pump, and thereby it is possible to supply a gas to the liquid to be processed.

(Functional Mechanism)

In the hollow fiber membrane module 10 of the first embodiment described above, a pressure loss during the flow of the liquid to be processed decreases due to the following reasons.

(i) Since the partition plate 50 is provided in the length direction of the hollow fiber membranes 22 so as to divide the first space I in the case 30 into the two regions of the first region A and the second region B, the liquid to be processed, which flows in the regions, is regulated by the partition plate 50 so as to flow in the length direction of the hollow fiber membranes 22.

(ii) The first space I in the case 30 is divided by the partition plate 50 into the two regions of the first region A and the second region B. Furthermore, the inlets for the liquid to be processed in the regions are formed in the range from the ends of the regions on the upstream side to $\frac{1}{3} \times X$ on the downstream side in the flowing direction of the liquid to be processed, and the outlets for the liquid to be processed in the regions are formed in the range from the ends of the regions on the downstream side to $\frac{1}{3} \times X$ on the upstream side in the flowing direction of the liquid to be processed. Therefore, the liquid to be processed, which flows in the regions, is likely to flow in the length direction of the hollow fiber membranes 22, and thus a short pass is unlikely to be formed.

(iii) Since the liquid to be processed is unlikely to flow in a right-angled or obliquely traversing direction of the hollow fiber membrane 22 according to (i) and (ii) described above, the pressure loss decreases, and thus it is possible to increase a flow volume of the liquid to be processed.

In the hollow fiber membrane module 10 of the first embodiment described above, it is possible to perform the sufficient degassing from or gas supply to the liquid to be processed due to the following reasons.

(iv) Since the first space I in the case 30 is divided by the partition plate 50 into the two regions of the first region A and the second region B, and the partition plate 50 is provided with the inlet 50a for the liquid to be processed in the second region B, which also serves as the outlet 50b for the liquid to be processed in the first region A, within a above-mentioned specific range (the vicinity of the ends of the regions), a flow path length more increases than in a case where the partition plate is not provided.

(v) As described in (ii) above, the liquid to be processed, which flows in the regions, is likely to flow in the length direction of the hollow fiber membranes 22, and thus the short pass is unlikely to be formed. Therefore, since it is possible to secure long flow paths in the regions, and a width of the flow path of the liquid to be processed is set to be narrow, a dead space, in which sufficient liquid to be processed does not flow, is unlikely to be formed in the regions, and thus it is possible to effectively use the hollow fiber membrane 22.

(vi) According to (iv) and (v) described above, since the flow path length increases, contact time with the hollow fiber membranes 22 is lengthened, and it is possible to effectively use the hollow fiber membranes 22 without waste, it is possible to perform the sufficient degassing from and gas supply to the liquid to be processed.

In the hollow fiber membrane module 10 of the first embodiment described above, the hollow fiber membranes 22 are bent into the U shape in the hollow fiber membrane bundle 20, and thus there is no need to affix one end portion of the hollow fiber membrane bundle 20 to the fixation part. Therefore, the one end of the hollow fiber membrane bundle 20 is released, a gas remaining between the hollow fiber membranes 22 is likely to escape, and thus the liquid to be processed can uniformly flow between the hollow fiber membranes 22. Therefore, it is not possible to perform more sufficient degassing from or gas supply to the liquid to be processed. In addition, since the hollow fiber membranes 22 are bent into the U shape, it is possible to secure a predetermined density of the hollow fiber membranes 22 among the small number of hollow fiber membranes 22. Therefore, a manufacturing efficiency of the hollow fiber membrane module 10 improves.

In addition, since the hollow fiber membranes 22 are bent into the U shape, an independent state thereof is likely to be maintained, and thus it is possible to suppress an uncontrollable spread of the hollow fiber membrane bundle 20. Therefore, the liquid to be processed is likely to be spread over the entire hollow fiber membrane bundle 20, and thus it is possible to perform more sufficient degassing from or gas supply to the liquid to be processed.

In the hollow fiber membrane module 10 of the first embodiment described above, since the hollow fiber membrane bundle 20 has the bending portions 22a that are arranged to be disposed at the substantially same position, the liquid to be processed is unlikely to locally flow to a part, and it is possible to suppress the spread of the hollow fiber membrane bundle 20. In this manner, the liquid to be processed is likely to be spread over the entire hollow fiber membrane bundle 20, the gas remaining between the hollow fiber membranes 22 is more likely to escape, and thus it is possible to perform more sufficient degassing from or gas supply to the liquid to be processed.

In the hollow fiber membrane module 10 of the first embodiment described above, since the hollow fiber membrane bundle 20 has the restriction fiber string 24 that extends in the direction orthogonal to the length direction of the hollow fiber membranes 22 while connecting the hollow fiber membranes 22, it is likely to reliably maintain the independent state of the hollow fiber membrane bundle 20, and thus it is possible to suitably suppress the uncontrollable spread of the hollow fiber membrane bundle 20. In a case where the liquid to be processed has high viscosity, it is easy for the hollow fiber membranes 22 to be significantly spread, and thus the restriction fiber string 24 functions effectively, particularly, in the case where the liquid to be processed has the high viscosity.

<Second Embodiment>

Figure 2:
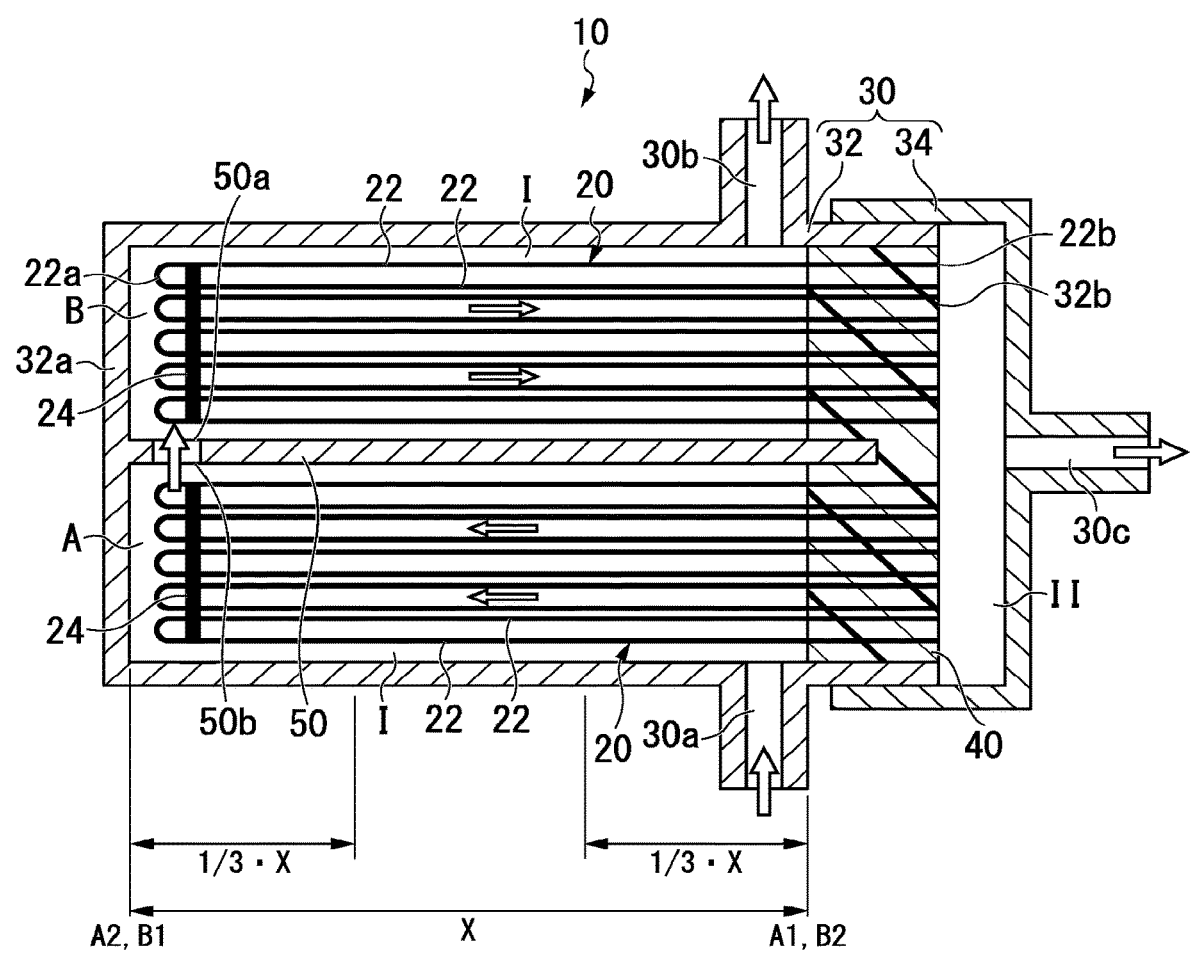
FIG. 2 is a sectional view illustrating a second embodiment of the hollow fiber membrane module of the invention.

FIG. 2 is a sectional view illustrating a second embodiment of the hollow fiber membrane module of the invention.

Differences between the hollow fiber membrane module 10 of the second embodiment and the hollow fiber membrane module 10 of the first embodiment are as follows.

The case main body 32 is provided with the inlet 30a for the liquid to be processed, which communicates with the inside of the case main body 32, at a position of a side wall which is close to the fixation part 40, and the outlet 30b for the processed liquid, which communicates with the inside of the case main body 32, at a position of a side wall that is opposite to the side wall provided with the inlet 30a for the liquid to be processed, the position being close to the fixation part 40.

The partition plate 50 is provided with the inlet 50a for the liquid to be processed in the second region B, which also serves as the outlet 50b for the liquid to be processed in the first region A, at a position close to the head portion 32a of the case main body 32.

Hereinafter, the same letters or numerals are assigned to the same configurations as those of the first embodiment, and thus the description thereof is omitted.

(Manufacturing Method for Hollow Fiber Membrane Module)

It is possible to manufacture the hollow fiber membrane module 10 of the second embodiment in the same manner as that of the hollow fiber membrane module 10 of the first embodiment.

(Degassing Method or Gas Supply Method)

It is possible to perform degassing from and gas supply to the liquid to be processed by using the hollow fiber membrane module 10 of the second embodiment in the same manner as the degassing from or the gas supply to the liquid to be processed by using the hollow fiber membrane module 10 of the first embodiment.

(Functional Mechanism)

It is possible for the hollow fiber membrane module 10 of the second embodiment described above to exhibit the same effects as those of the hollow fiber membrane module 10 of the first embodiment by the same functional mechanism as that of the hollow fiber membrane module 10 of the first embodiment.

<Third Embodiment>

Figure 3:
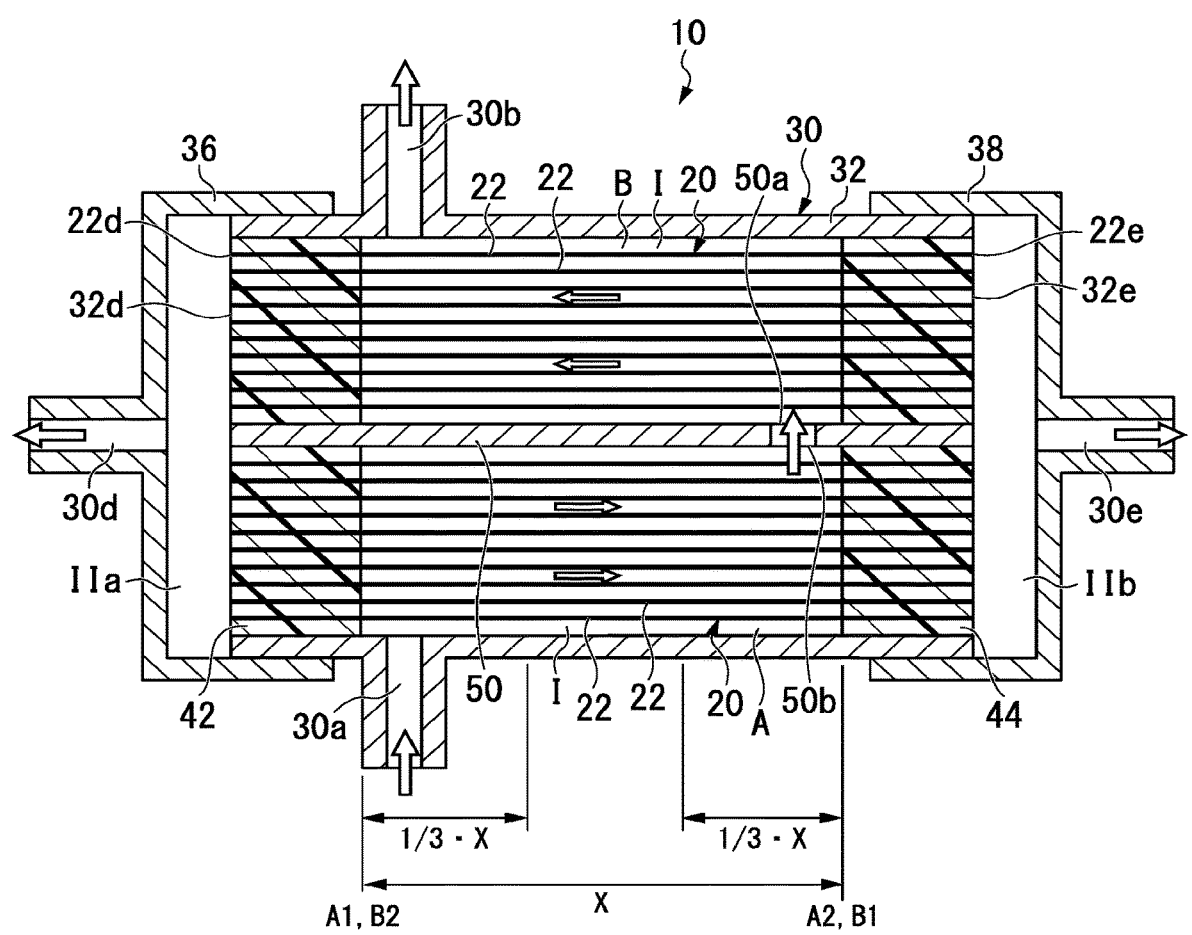
FIG. 3 is a sectional view illustrating a third embodiment of the hollow fiber membrane module of the invention.

FIG. 3 is a sectional view illustrating a third embodiment of the hollow fiber membrane module of the invention.

The hollow fiber membrane module 10 includes the hollow fiber membrane bundle 20, the case 30, a first fixation part 42, a second fixation part 44, and the partition plate 50.

Hereinafter, the same letters or numerals are assigned to the same configurations as those of the first embodiment, and thus the description thereof is omitted.

(Hollow Fiber Membrane Bundle)

The hollow fiber membrane bundle 20 is formed by the plurality of hollow fiber membranes 22 having length directions that are arranged in one direction. In the hollow fiber membrane bundle 20, first opening end portions 22d of the hollow fiber membranes 22 are arranged to be disposed at the same position, and second opening end portions 22e of the hollow fiber membranes 22 are arranged to be disposed at the same position.

(Case)

The case 30 is a member that houses the hollow fiber membrane bundle 20.

The inside of the case 30 is sealed in a liquid-tight or airtight manner such that the liquid to be processed or the gas in the inside does not leak out to the outside, except for the inlet 30a for the liquid to be processed, the outlet 30b for the processed liquid, a first gas inlet/outlet 30d, and a second gas inlet/outlet 30e.

The case 30 includes a case main body 32 having an angled cylindrical shape, which houses the hollow fiber membrane bundle 20 such that the first opening end portion 22d of the hollow fiber membrane 22 is disposed on a side of a first case opening 32d and a side of the second opening end portion 22e of the hollow fiber membrane 22 is disposed on a side of a second case opening 32e, a first lid body 36 that covers the first case opening 32d of the case main body 32 so as to form a space between the first case opening 32d and the first lid body, and a second lid body 38 that covers the second case opening 32e of the case main body 32 so as to form a space between the second case opening 32e and the second lid body. The case main body 32 and the first lid body 36 are joined to each other by screwing, fusion-bonding, adhesion, or the like. The case main body 32 and the second lid body 38 are joined to each other by screwing, fusion-bonding, adhesion, or the like.

The case main body 32 is provided with the inlet 30a for the liquid to be processed, which communicates with the inside of the case main body 32, at a position of the side wall which is close to the first fixation part 42, and the outlet 30b for the processed liquid, which communicates with the inside of the case main body 32, at a position of a side wall that is opposite to the side wall provided with the inlet 30a for the liquid to be processed, the position being close to the first fixation part 42.

The first lid body 36 has a canopy portion that is provided with the first gas inlet/outlet 30d that communicates with an inside of the first lid body 36.

The second lid body 38 has a canopy portion that is provided with the second gas inlet/outlet 30e that communicates with an inside of the second lid body 38.

(Fixation Part)

The first fixation part 42 affixes the first opening end portion 22d of the hollow fiber membrane 22 in the case 30 in a state of maintaining an opening thereof and partitions a space in the case 30 in a liquid-tight manner into the first space I on the outer side of the hollow fiber membrane 22 and a second space IIa that communicates with the inner side of the hollow fiber membrane 22.

The second fixation part 44 affixes the second opening end portion 22e of the hollow fiber membrane 22 in the case 30 in a state of maintaining an opening thereof and partitions the space in the case 30 in a liquid-tight manner into the first space I on the outer side of the hollow fiber membrane 22 and a second space IIb that communicates with the inner side of the hollow fiber membrane 22.

The first fixation part 42 affixes the first opening end portion 22d of the hollow fiber membrane 20 and the vicinity thereof to the first case opening 32d of the case main body 32 and the vicinity thereof such that a side of the first opening end portion 22d of the hollow fiber membrane 22 is disposed on a side of the first case opening 32d of the case main body 32.

The second fixation part 44 affixes the second opening end portion 22e of the hollow fiber membrane 20 and the vicinity thereof to the second case opening 32e of the case main body 32 and the vicinity thereof such that a side of the second opening end portion 22e of the hollow fiber membrane 22 is disposed on a side of the second case opening 32e of the case main body 32.

The first space I is a space surrounded by the case main body 32, the first fixation part 42, and the second fixation part 44 (excluding the hollow fiber membranes 22). The first space I communicates with the inlet 30a for the liquid to be processed and the outlet 30b for the processed liquid and is a flow path of the liquid to be processed. In the first space I, the hollow fiber membrane bundle 20 is present, and the liquid to be processed comes into contact with the hollow fiber membrane 22.

The second space IIa is a space surrounded by the first lid body 36 and the first fixation part 42. The second space IIa communicates with the first gas inlet/outlet 30d and is a flow path of gas.

The second space IIb is a space surrounded by the second lid body 38 and the second fixation part 44. The second space IIb communicates with the second gas inlet/outlet 30e and is a flow path of gas.

(Partition Plate)

The partition plate 50 is one plate provided in the length direction of the hollow fiber membranes 22 so as to divide the first space I into two regions of the first region A that communicates with the inlet 30a for the liquid to be processed and the second region B that communicates with the outlet 30b for the processed liquid.

The partition plate 50 seals the regions in a liquid-tight manner such that the liquid to be processed does not leak out to an adjacent region, except for the inlet 50a for the liquid to be processed, which also serves as the outlet 50b for the liquid to be processed.

The partition plate 50 is provided in the case main body 32 such that the first end portion of the partition plate is buried in the first fixation part 42, the second end portion thereof is buried in the second fixation part 44, and side portions thereof are integrally joined to the side walls of the case main body 32.

The partition plate 50 distributes about a half of the hollow fiber membranes 22 constituting the hollow fiber membrane bundle 20 in the first region A and distributes about a half of the remaining hollow fiber membranes 22 constituting the hollow fiber membrane bundle 20 in the second region B. The partition plate 50 is provided with the inlet 50a for the liquid to be processed in the second region B, which also serves as the outlet 50b for the liquid to be processed in the first region A, at a position close to the second fixation part 44.

(Manufacturing Method for Hollow Fiber Membrane Module)

It is possible to manufacture the hollow fiber membrane module 10 of the third embodiment by a known manufacturing method. For example, it is possible to manufacture the hollow fiber membrane module in the following procedure.

While the hollow fiber membrane, which is the weft, is folded to have a preset length, folded portions on both sides are connected with a chain-stitched warp, by using a Raschel knitting machine, and thereby a hollow fiber membrane sheet-shaped object of the Raschel knitted fabric is manufactured.

While the hollow fiber membrane sheet-shaped object is folded down in each of the first region A and the second region B of the case main body 32 in which the partition plate 50 that is integrally joined to the side walls is provided, the hollow fiber membranes 22 are inserted to be parallel to the partition plate 50.

A liquid-phase potting material is supplied to the first case opening 32d of the case main body 32 and the vicinity thereof and is hardened or solidified, and thereby the first fixation part 42 is formed.

A liquid-phase potting material is supplied to the second case opening 32e of the case main body 32 and the vicinity thereof and is hardened or solidified, and thereby the second fixation part 44 is formed.

An end portion of the first fixation part 42 on the side of the first case opening 32d of the case main body 32 is cut at each of the end portion of the case main body 32 and a folded end portion of the hollow fiber membrane sheet-shaped object, and thereby the first opening end portions 22d of the hollow fiber membranes 22 are formed.

An end portion of the second fixation part 44 on the side of the second case opening 32e of the case main body 32 is cut at each of the end portion of the case main body 32 and the folded end portion of the hollow fiber membrane sheet-shaped object, and thereby the second opening end portions 22e of the hollow fiber membranes 22 are formed.

The first lid body 36 is joined to the case main body so as to cover the first case opening 32d of the case main body 32, and the second lid body 38 is joined to the case main body so as to cover the second case opening 32e of the case main body 32 such that the case 30 is completed, and the hollow fiber membrane module 10 is obtained.

(Degassing Method or Gas Supply Method)

Degassing from or gas supply to the liquid to be processed by using the hollow fiber membrane module 10 of the third embodiment can be performed as follows.

A vacuum pump (not illustrated) is connected to the first gas inlet/outlet 30d of the first lid body 36 and the second gas inlet/outlet 30e of the second lid body 38 of the case 30. Otherwise, a configuration may be employed, in which either the first gas inlet/outlet 30d or the second gas inlet/outlet 30e is sealed, and the vacuum pump is connected only to one side.

A squeeze pump (not illustrated) is connected to the inlet 30a for the liquid to be processed of the case main body 32 of the case 30, or a suction pump (not illustrated) is connected to the outlet 30b for the processed liquid.

The vacuum pump is operated such that a pressure in the second space IIa in the first lid body 36 and a pressure in the second space IIb in the second lid body 38 are in a pressure reduction state, and a pressure in the hollow fiber membrane 22 of the hollow fiber membrane bundle 20, which communicates with the second space IIa and the second space IIb, is in a pressure reduction state.

The squeeze pump or the suction pump is operated such that the liquid to be processed is supplied to the first region A of the first space I in the case main body 32 from the inlet 30a for the liquid to be processed.

The liquid to be processed, which has supplied to the first region A, flows in the first region A in the length direction of the hollow fiber membranes 22 from the side of the upstream end A1 to the side of the downstream end A2.

The liquid to be processed, which has reached the side of the downstream end A2 of the first region A, moves to the second region B of the first space I in the case main body 32 through the inlet 50a for the liquid to be processed in the second region B, which also serves as the outlet 50b for the liquid to be processed in the first region A.

The liquid to be processed, which has moved to the second region B, flows in the second region B in the length direction of the hollow fiber membranes 22 from the side of the upstream end B1 to the side of the downstream end B2.

The liquid to be processed, which has reached the side of the downstream end B2 of the second region B, is discharged out of the case main body 32 through the outlet 30b for the processed liquid in the second region B.

While the liquid to be processed flows in the first region A and the second region B, the liquid to be processed comes into contact with the outer side of the hollow fiber membrane 22. A dissolved gas in the liquid to be processed, which comes into contact with the outer side of the hollow fiber membrane 22, moves to the inner side with the pressure in the pressure reduction state from the outer side of the hollow fiber membrane 22. As described above, the dissolved gas is removed from the liquid to be processed.

Note that a pressure pump is connected to the first gas inlet/outlet 30d of the first lid body 36 and the second gas inlet/outlet 30e of the second lid body 38 of the case 30, instead of the vacuum pump, and thereby it is possible to supply a gas to the liquid to be processed.

(Functional Mechanism)

It is possible for the hollow fiber membrane module 10 of the third embodiment described above to exhibit the same effects as those of the hollow fiber membrane module 10 of the first embodiment by the same functional mechanism as that of the hollow fiber membrane module 10 of the first embodiment.

<Fourth Embodiment>

Figure 4:
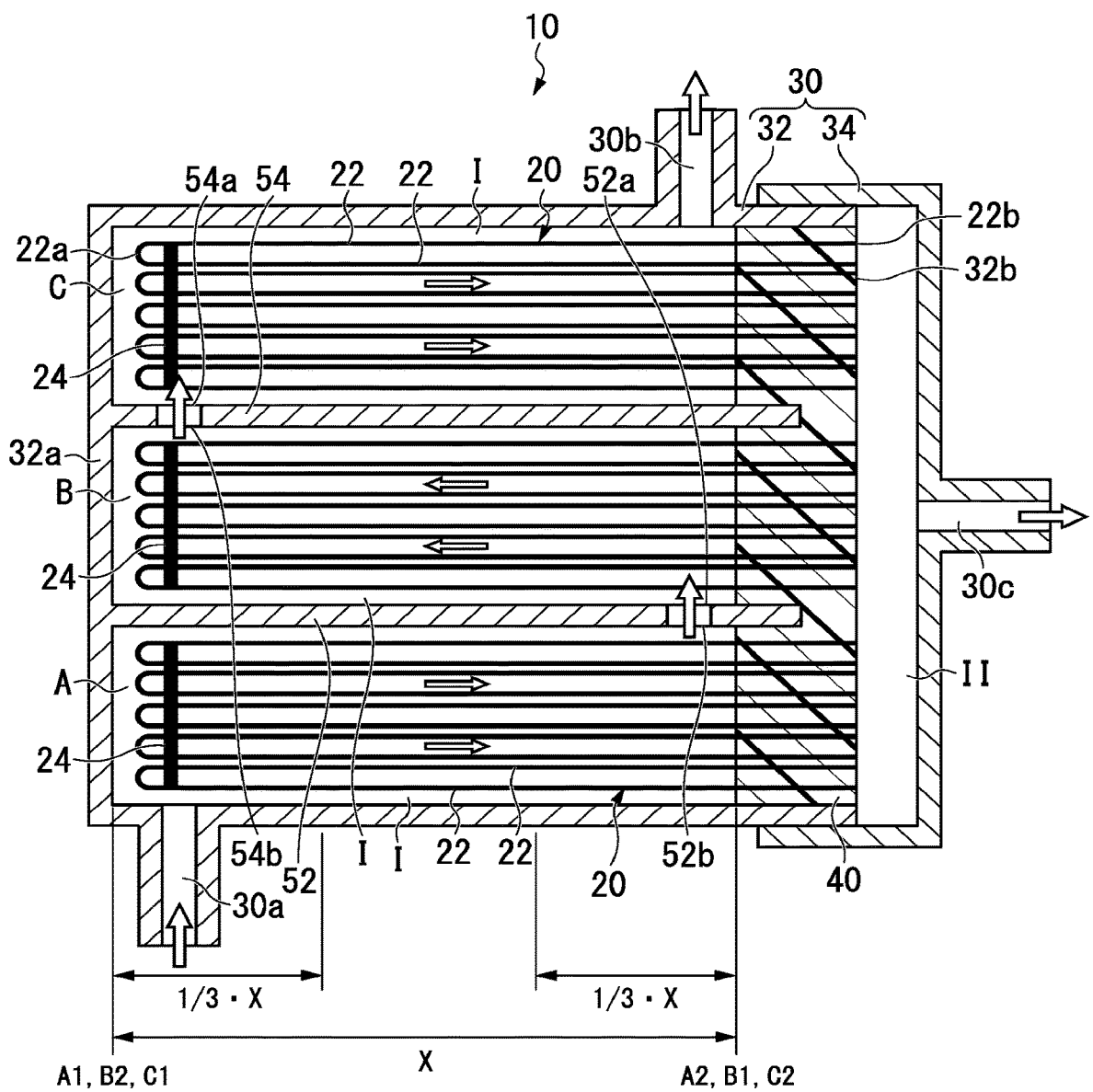
FIG. 4 is a sectional view illustrating a fourth embodiment of the hollow fiber membrane module of the invention.

FIG. 4 is a sectional view illustrating a fourth embodiment of the hollow fiber membrane module of the invention.

The hollow fiber membrane module 10 includes the hollow fiber membrane bundle 20, the case 30, the fixation part 40, a first partition plate 52, and a second partition plate 54.

Hereinafter, the same letters or numerals are assigned to the same configurations as those of the first embodiment, and thus the description thereof is omitted.

(Case)

The case 30 is a member that houses the hollow fiber membrane bundle 20.

An inside of the case 30 is sealed in a liquid-tight or airtight manner such that the liquid to be processed or a gas in the inside does not leak out to the outside, except for the inlet 30a for the liquid to be processed, the outlet 30b for the processed liquid, and the gas inlet/outlet 30c.

The case 30 includes the case main body 32 having a bottomed box shape, which houses the hollow fiber membrane bundle 20 such that the bending portion 22a of the hollow fiber membrane 22 is disposed on the side of the head portion 32a and the side of the opening end portion 22b of the hollow fiber membrane 22 is disposed on the side of the case opening 32b, and the lid body 34 that covers the case opening 32b of the case main body 32 so as to form a space between the case opening 32b and the lid body. The case main body 32 and the lid body 34 are joined to each other by screwing, fusion-bonding, adhesion, or the like.

The case main body 32 is provided with the inlet 30a for the liquid to be processed, which communicates with the inside of the case main body 32, at a position of a side wall which is close to the head portion 32a, and the outlet 30b for the processed liquid, which communicates with the inside of the case main body 32, at a position of a side wall that is opposite to the side wall provided with the inlet 30a for the liquid to be processed, the position being close to the fixation part 40.

The lid body 34 has a canopy portion that is provided with the gas inlet/outlet 30c that communicates with the inside of the lid body 34.

(Partition Plate)

The first partition plate 52 and the second partition plate 54 are two plates provided in the length direction of the hollow fiber membranes 22 so as to divide the first space I into three regions of the first region A that communicates with the inlet 30a for the liquid to be processed, a third region C that communicates with the outlet 30b for the processed liquid, and the second region B therebetween.

The first partition plate 52 seals the regions in a liquid-tight manner such that the liquid to be processed does not leak out to an adjacent region, except for an inlet 52a for the liquid to be processed, which also serves as an outlet 52b for the liquid to be processed.

The second partition plate 54 seals the regions in a liquid-tight manner such that the liquid to be processed does not leak out to an adjacent region, except for an inlet 54a for the liquid to be processed, which also serves as an outlet 54b for the liquid to be processed.

The first partition plate 52 and the second partition plate 54 are provided in the case main body 32 such that first end portions of the partition plates are integrally joined to the head portion 32a of the case main body 32, second end portions thereof are buried in the fixation part 40, and side portions thereof are integrally joined to the side walls of the case main body 32.

The first partition plate 52 and the second partition plate 54 distribute about a third of the hollow fiber membranes 22 constituting the hollow fiber membrane bundle 20 in the first region A, distributes about a third of the hollow fiber membranes 22 constituting the hollow fiber membrane bundle 20 in the second region B, and distributes about a third of the remaining hollow fiber membranes 22 constituting the hollow fiber membrane bundle 20 in the third region C.

The first partition plate 52 is provided with the inlet 52a for the liquid to be processed in the second region B, which also serves as the outlet 52b for the liquid to be processed in the first region A, at a position close to the fixation part 40.

The second partition plate 54 is provided with the inlet 54a for the liquid to be processed in the third region C, which also serves as the outlet 54b for the liquid to be processed in the second region B, at a position close to the head portion 32a of the case main body 32.

(Inlet for Liquid to Be Processed and Outlet for Liquid to Be Processed)

The case main body 32 of the case 30 is provided with the inlet 30a for the liquid to be processed in the first region A and the outlet 30b for the processed liquid in the third region C.

The first partition plate 52 is provided with the inlet 52a for the liquid to be processed in the second region B, which also serves as the outlet 52b for the liquid to be processed in the first region A.

The second partition plate 54 is provided with the inlet 54a for the liquid to be processed in the third region C, which also serves as the outlet 54b for the liquid to be processed in the second region B.

When X represents a length of the first region A in the length direction of the hollow fiber membranes 22, the inlet 30a for the liquid to be processed is formed in a range from the upstream end A1 of the first region A on the upstream side to $\frac{1}{3} \times X$ on the downstream side in the flowing direction of the liquid to be processed. In addition, the outlet 52b for the liquid to be processed is formed in a range from the downstream end A2 of the first region A on the downstream side to $\frac{1}{3} \times X$ on the upstream side in the flowing direction of the liquid to be processed.

When X represents a length of the second region B in the length direction of the hollow fiber membranes 22, the inlet 52a for the liquid to be processed is formed in a range from the upstream end B1 of the second region B on the upstream side to $\frac{1}{3} \times X$ on the downstream side in the flowing direction of the liquid to be processed. In addition, the outlet 54b for the processed liquid is formed in a range from the downstream end B2 of the second region B on the downstream side to $\frac{1}{3} \times X$ on the upstream side in the flowing direction of the liquid to be processed.

When X represents a length of the third region C in the length direction of the hollow fiber membranes 22, the inlet 54a for the liquid to be processed is formed in a range from an upstream end C1 of the third region C on the upstream side to $\frac{1}{3} \times X$ on the downstream side in the flowing direction of the liquid to be processed. In addition, the outlet 30b for the processed liquid is formed in a range from a downstream end C2 of the third region C on the downstream side to $\frac{1}{3} \times X$ on the upstream side in the flowing direction of the liquid to be processed.

The inlets for the liquid to be processed in the regions are formed in the range from the ends of the regions on the upstream side to $\frac{1}{3} \times X$ (preferably, $\frac{1}{4} \times X$ and, more preferably, $\frac{1}{5} \times X$) on the downstream side in the flowing direction of the liquid to be processed, and the outlets for the liquid to be processed in the regions are formed in a range from the ends of the regions on the downstream side to $\frac{1}{3} \times X$ (preferably, $\frac{1}{4} \times X$ and, more preferably, $\frac{1}{5} \times X$) on the upstream side in the flowing direction of the liquid to be processed. In this manner, long flow paths are secured in the regions.

(Manufacturing Method for Hollow Fiber Membrane Module)

It is possible to manufacture the hollow fiber membrane module 10 of the fourth embodiment by a known manufacturing method. For example, it is possible to manufacture the hollow fiber membrane module in the following procedure.

While the hollow fiber membrane, which is the weft, is folded to have a preset length, folded portions on both sides are connected with a chain-stitched warp, by using a Raschel knitting machine, and thereby a hollow fiber membrane sheet-shaped object of the Raschel knitted fabric is manufactured.

While the hollow fiber membrane sheet-shaped object is folded down in each of the first region A, the second region B, and the third region C of the case main body 32 in which the first partition plate 52 and the second partition plate 54 that are integrally joined to the head portion 32a and the side wall are provided, the hollow fiber membranes 22 are inserted to be parallel to the first partition plate 52 and the second partition plate 54.

A liquid-phase potting material is supplied to the case opening 32b of the case main body 32 and the vicinity thereof and is hardened or solidified, and thereby the fixation part 40 is formed.

An end portion of the fixation part 40 on the side of the case opening 32b of the case main body 32 is cut at each of the end portion of the case main body 32 and a folded end portion of the hollow fiber membrane sheet-shaped object, and thereby the opening end portions 22b of the hollow fiber membranes 22 are formed.

The lid body 34 is joined to the case main body so as to cover the case opening 32b of the case main body 32 such that the case 30 is completed, and the hollow fiber membrane module 10 is obtained.

(Degassing Method or Gas Supply Method)

Degassing from or gas supply to the liquid to be processed by using the hollow fiber membrane module 10 of the fourth embodiment can be performed as follows.

A vacuum pump (not illustrated) is connected to the gas inlet/outlet 30c of the lid body 34 of the case 30.

A squeeze pump (not illustrated) is connected to the inlet 30a for the liquid to be processed of the case main body 32 of the case 30, or a suction pump (not illustrated) is connected to the outlet 30b for the processed liquid.

The vacuum pump is operated such that a pressure in the second space II in the lid body 34 is in a pressure reduction state, and a pressure in the hollow fiber membrane 22 of the hollow fiber membrane bundle 20, which communicates with the second space II, is in a pressure reduction state.

The squeeze pump or the suction pump is operated such that the liquid to be processed is supplied to the first region A of the first space I in the case main body 32 from the inlet 30a for the liquid to be processed.

The liquid to be processed, which has supplied to the first region A, flows in the first region A in the length direction of the hollow fiber membranes 22 from the side of the upstream end A1 to the side of the downstream end A2.

The liquid to be processed, which has reached the side of the downstream end A2 of the first region A, moves to the second region B of the first space I in the case main body 32 through the inlet 52a for the liquid to be processed in the second region B, which also serves as the outlet 52b for the liquid to be processed in the first region A.

The liquid to be processed, which has moved to the second region B, flows in the second region B in the length direction of the hollow fiber membranes 22 from the side of the upstream end B1 to the side of the downstream end B2.

The liquid to be processed, which has reached the side of the downstream end B2 of the second region B, moves to the third region C of the first space I in the case main body 32 through the inlet 54a for the liquid to be processed in the third region C, which also serves as the outlet 54b for the liquid to be processed in the second region B.

The liquid to be processed, which has moved to the third region C, flows in the third region C in the length direction of the hollow fiber membranes 22 from a side of the upstream end C1 to a side of the downstream end C2.

The liquid to be processed, which has reached the side of the downstream end C2 of the third region C, is discharged out of the case main body 32 through the outlet 30b for the processed liquid in the third region C.

While the liquid to be processed flows in the first region A, the second region B, and the third region C, the liquid to be processed comes into contact with the outer side of the hollow fiber membrane 22. A dissolved gas in the liquid to be processed, which comes into contact with the outer side of the hollow fiber membrane 22, moves to the inner side with the pressure in the pressure reduction state from the outer side of the hollow fiber membrane 22. As described above, the dissolved gas is removed from the liquid to be processed.

Note that a pressure pump is connected to the gas inlet/outlet 30c of the lid body 34 of the case 30, instead of the vacuum pump, and thereby it is possible to supply a gas to the liquid to be processed.

(Functional Mechanism)

In the hollow fiber membrane module 10 of the fourth embodiment described above, a pressure loss during the flow of the liquid to be processed decreases due to the following reasons.

(i) Since the first partition plate 52 and the second partition plate 54 are provided in the length direction of the hollow fiber membranes 22 so as to divide the first space I in the case 30 into the three regions of the first region A, the second region B, and the third region C, the liquid to be processed, which flows in the regions, is regulated by the first partition plate 52 and the second partition plate 54 so as to flow in the length direction of the hollow fiber membranes 22.

(ii) Since the first space I in the case 30 is divided by the first partition plate 52 and the second partition plate 54 into the three regions of the first region A, the second region B, and the third region C, the liquid to be processed, which flows in the regions, is likely to flow in the length direction of the hollow fiber membranes 22, and thus a short pass is unlikely to be formed.

(iii) Since the liquid to be processed is unlikely to flow in a right-angled or obliquely traversing direction of the hollow fiber membrane 22 according to (i) and (ii) described above, the pressure loss decreases, and thus it is possible to increase a flow volume of the liquid to be processed.

In the hollow fiber membrane module 10 of the fourth embodiment described above, it is possible to perform the sufficient degassing from or gas supply to the liquid to be processed due to the following reasons.

(iv) Since the first space I in the case 30 is divided by the first partition plate 52 and the second partition plate 54 into the three regions of the first region A, the second region B, and the third region C, the first partition plate 52 is provided with the inlet 52a for the liquid to be processed in the second region B, which also serves as the outlet 52b for the liquid to be processed in the first region A, within the above-mentioned specific range (the vicinity of the ends of the regions), and the second partition plate 54 is provided with the inlet 54a for the liquid to be processed in the third region C, which also serves as the outlet 54b for the liquid to be processed in the second region B, within the above-mentioned specific range (the vicinity of the ends of the regions), a flow path length more increases than in a case where the partition plate is not provided.

(v) As described in (ii) above, the liquid to be processed, which flows in the regions, is likely to flow in the length direction of the hollow fiber membranes 22, and thus the short pass is unlikely to be formed. Therefore, since it is possible to secure long flow paths in the regions, and a width of the flow path of the liquid to be processed is set to be narrow, a dead space, in which sufficient liquid to be processed does not flow, is unlikely to be formed in the regions, and thus it is possible to effectively use the hollow fiber membrane 22.

(vi) According to (iv) and (v) described above, since the flow path length increases, contact time with the hollow fiber membranes 22 is lengthened, and it is possible to effectively use the hollow fiber membranes 22 without waste, it is possible to perform the sufficient degassing from and gas supply to the liquid to be processed.

It is possible for the hollow fiber membrane module 10 of the fourth embodiment described above to exhibit the same effects as those of the hollow fiber membrane module 10 of the first embodiment by the same functional mechanism as that of the hollow fiber membrane module 10 of the first embodiment because the hollow fiber membranes 22 in the hollow fiber membrane bundle 20 are bent into the U shape.

It is possible for the hollow fiber membrane module 10 of the fourth embodiment described above to exhibit the same effects as those of the hollow fiber membrane module 10 of the first embodiment by the same functional mechanism as that of the hollow fiber membrane module 10 of the first embodiment because the bending portions 22a are arranged to be disposed substantially at the same position in the hollow fiber membrane bundle 20.

It is possible for the hollow fiber membrane module 10 of the fourth embodiment described above to exhibit the same effects as those of the hollow fiber membrane module 10 of the first embodiment by the same functional mechanism as that of the hollow fiber membrane module 10 of the first embodiment because the hollow fiber membrane bundle 20 has the restriction fiber string 24 that extends in the direction orthogonal to the length direction of the hollow fiber membranes 22 while connecting the hollow fiber membranes 22.

<Fifth Embodiment>

Figure 5:
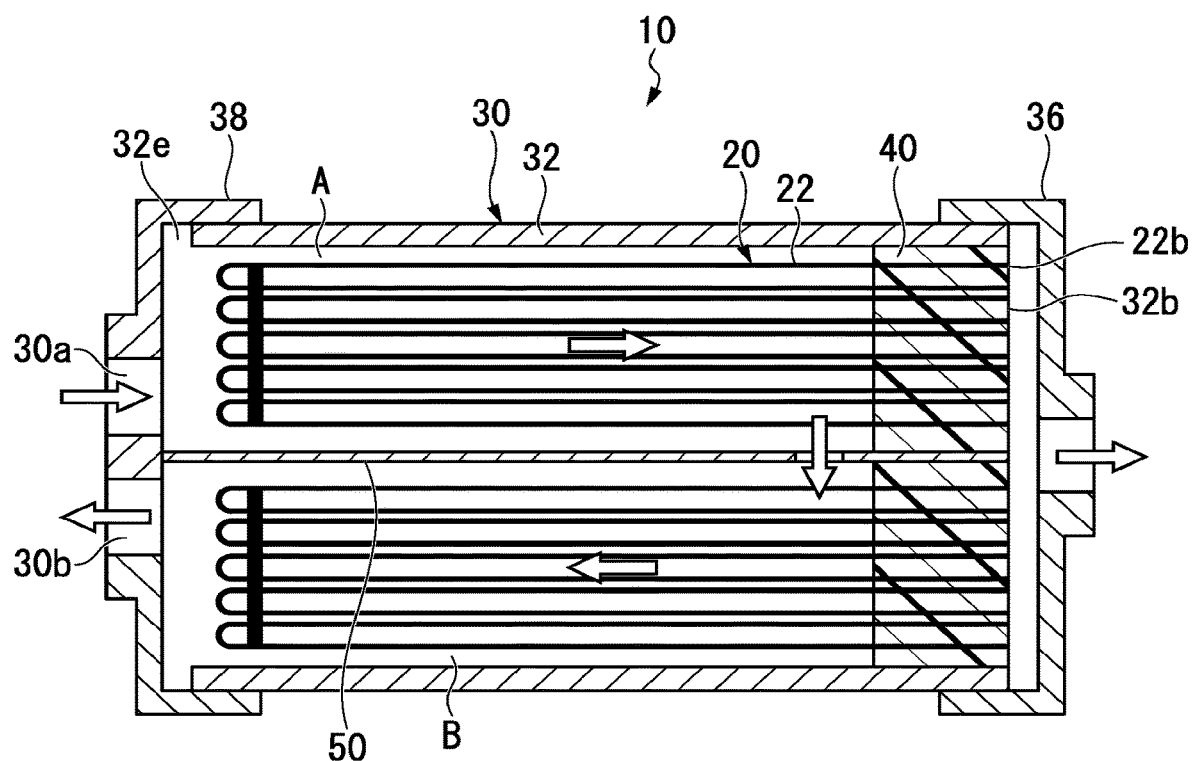
FIG. 5 is a sectional view illustrating a fifth embodiment of the hollow fiber membrane module of the invention.

FIG. 5 is a sectional view illustrating a fifth embodiment of the hollow fiber membrane module of the invention.

Differences between the hollow fiber membrane module 10 of the fifth embodiment and the hollow fiber membrane module 10 of the first embodiment are as follows.

The second lid body 38 is provided on an end portion side opposite to the opening end portion of the hollow fiber membrane bundle 20, and the second lid body 38 is provided with the inlet 30a for the liquid to be processed and the outlet 30b for the processed liquid.

Hereinafter, the same letters or numerals are assigned to the same configurations as those of the first embodiment, and thus the description thereof is omitted.

(Second Lid Body)

The second lid body 38 is provided with the inlet 30a for the liquid to be processed and the outlet 30b for the processed liquid. The inlet 30a for the liquid to be processed is formed to communicate with the first region A, and the outlet 30b for the processed liquid is formed to communicate with the second region B.

(Manufacturing Method for Hollow Fiber Membrane Module)

It is possible to manufacture the hollow fiber membrane module 10 of the fifth embodiment by a known manufacturing method. For example, it is possible to manufacture the hollow fiber membrane module in the following procedure.

While the hollow fiber membrane, which is the weft, is folded to have a preset length, folded portions on both sides are connected with a chain-stitched warp, by using a Raschel knitting machine, and thereby a hollow fiber membrane sheet-shaped object of the Raschel knitted fabric is manufactured.

While the hollow fiber membrane sheet-shaped object is folded down in each of the first region A and the second region B of the case main body 32 in which the partition plate 50 that is integrally joined to the side walls is provided, the hollow fiber membranes 22 are inserted to be parallel to the partition plate 50.

A liquid-phase potting material is supplied to a side of a first case opening 32b of the case main body 32 and the vicinity thereof and is hardened or solidified, and thereby the fixation part 40 is formed.

An end portion of the fixation part 40 on the side of the first case opening 32b of the case main body 32 is cut at each of the end portion of the case main body 32 and a folded end portion of the hollow fiber membrane sheet-shaped object, and thereby the opening end portions 22b of the hollow fiber membranes 22 are formed.

The first lid body 36 is joined to the case main body so as to cover the first case opening 32b of the case main body 32, and the second lid body 38 is joined to the case main body so as to cover the second case opening 32e of the case main body 32 such that the case 30 is completed, and the hollow fiber membrane module 10 is obtained.

(Degassing Method or Gas Supply Method)

It is possible to perform degassing from and gas supply to the liquid to be processed by using the hollow fiber membrane module 10 of the fifth embodiment in the same manner as the degassing from or the gas supply to the liquid to be processed by using the hollow fiber membrane module 10 of the first embodiment.

(Functional Mechanism)

It is possible for the hollow fiber membrane module 10 of the fifth embodiment described above to exhibit the same effects as those of the hollow fiber membrane module 10 of the first embodiment by the same functional mechanism as that of the hollow fiber membrane module 10 of the first embodiment.

<Sixth Embodiment>

Figure 6:
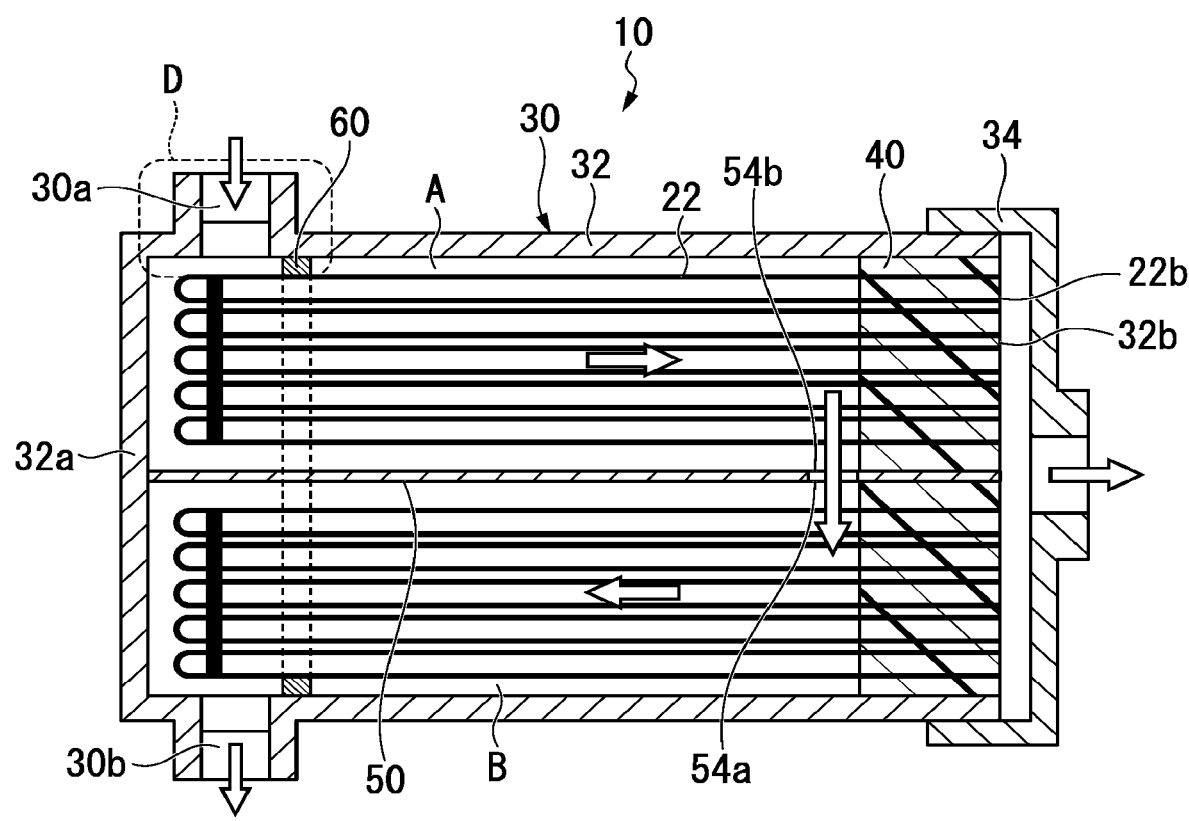
FIG. 6 is a sectional view illustrating a sixth embodiment of the hollow fiber membrane module of the invention.

FIG. 6 is a sectional view illustrating a sixth embodiment of the hollow fiber membrane module of the invention.

Differences between the hollow fiber membrane module 10 of the sixth embodiment and the hollow fiber membrane module 10 of the first embodiment are as follows.

A blocking portion 60 is provided to block the flow of the liquid to be processed in a gap between the hollow fiber membrane bundle and the case.

Hereinafter, the same letters or numerals are assigned to the same configurations as those of the first embodiment, and thus the description thereof is omitted.

(Blocking Portion)

Figure 7:
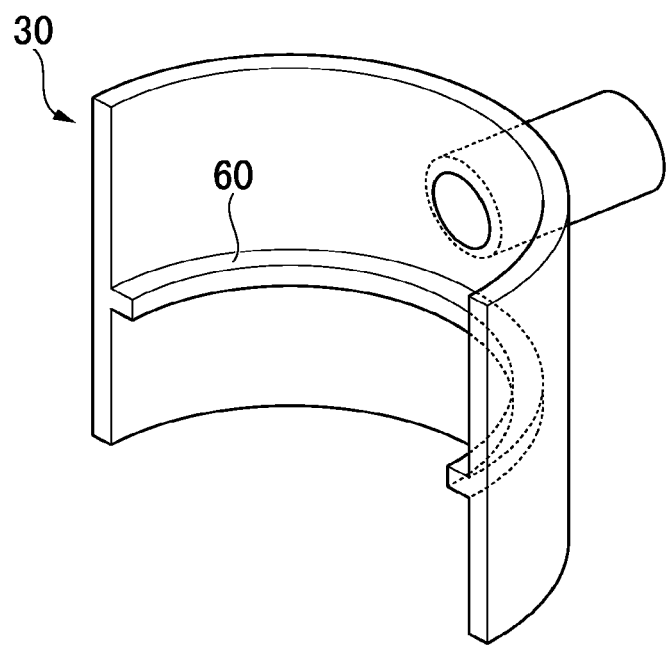
FIG. 7 is an enlarged perspective view of portion D in FIG. 6.

The blocking portion 60 is formed on an inner surface of the case 30. FIG. 7 is an enlarged perspective view of portion D in FIG. 6. It is preferable that the blocking portion 60 have a shape of protrusion formed in a ring shape on the inner surface of the case 30 as illustrated in FIG. 7. It is preferable to form the blocking portion 60 between the inlet 30a for the liquid to be processed and the outlet 54b for the liquid to be processed, and it is preferable to form the blocking portion between the inlet 54a for the liquid to be processed and the outlet 30b for the processed liquid. When the blocking portion is formed in the vicinity of the inlet 30a for the liquid to be processed, and X represents a length of a region in the length direction of the hollow fiber membranes 22, it is preferable to form the blocking portion in a range from an end of the region on the upstream side to ⅓×X on the downstream side in the flowing direction of the liquid to be processed. In addition, when the blocking portion is formed in the vicinity of the outlet 30b for the processed liquid, and X represents a length of the region in the length direction of the hollow fiber membranes 22, it is preferable to form the blocking portion in a range from the end of the region on the downstream side to ⅓×X on the upstream side in the flowing direction of the liquid to be processed.

(Manufacturing Method for Hollow Fiber Membrane Module)

It is possible to manufacture the hollow fiber membrane module 10 of the sixth embodiment by a known manufacturing method. For example, it is possible to manufacture the hollow fiber membrane module in the following procedure.

While the hollow fiber membrane, which is the weft, is folded to have a preset length, folded portions on both sides are connected with a chain-stitched warp, by using a Raschel knitting machine, and thereby a hollow fiber membrane sheet-shaped object of the Raschel knitted fabric is manufactured.

While the blocking portion 60 is provided on an inner wall, and the hollow fiber membrane sheet-shaped object is folded down in each of the first region A and the second region B of the case main body 32 in which the partition plate 50 that is integrally joined to a bottom portion 32a and the side wall is provided, the hollow fiber membranes 22 are inserted to be parallel to the partition plate 50.

A liquid-phase potting material is supplied to the case opening 32b of the case main body 32 and the vicinity thereof and is hardened or solidified, and thereby the fixation part 40 is formed.

An end portion of the fixation part 40 on the side of the case opening 32b of the case main body 32 is cut at each of the end portion of the case main body 32 and a folded end portion of the hollow fiber membrane sheet-shaped object, and thereby the opening end portions 22b of the hollow fiber membranes 22 are formed.

The lid body 34 is joined to the case main body so as to cover the case opening 32b of the case main body 32 such that the case 30 is completed, and the hollow fiber membrane module 10 is obtained.

(Degassing Method or Gas Supply Method)

It is possible to perform degassing from and gas supply to the liquid to be processed by using the hollow fiber membrane module 10 of the sixth embodiment in the same manner as the degassing from or the gas supply to the liquid to be processed by using the hollow fiber membrane module 10 of the first embodiment.

(Functional Mechanism)

It is possible for the hollow fiber membrane module 10 of the sixth embodiment described above to exhibit the same effects as those of the hollow fiber membrane module 10 of the first embodiment by the same functional mechanism as that of the hollow fiber membrane module 10 of the first embodiment.

Further, the blocking portion 60 causes the flowing direction of the liquid to be processed, which flows in the gas between the hollow fiber membrane bundle 20 and the case, to be changed, and thus the liquid to be processed is likely to come into contact with the hollow fiber membrane 22.

<Other Embodiments>

Note that the hollow fiber membrane module of the invention may be used for removing a gas from the liquid to be processed and supplying a gas to the liquid to be processed, the module including: the hollow fiber membrane bundle formed by the plurality of hollow fiber membranes having the length directions which are arranged; the case in which the hollow fiber membrane bundle is housed; the fixation part that affixes the opening end portion of each of the hollow fiber membranes in the case in a state of maintaining the opening thereof and partitions a space in the case in a liquid-tight manner into a first space on an outer side of the hollow fiber membranes and a second space that communicates with the inner side of each of the hollow fiber membranes; and (n−1) partition plates provided in the length direction of the hollow fiber membranes so as to divide the first space into n regions (here, n is an integer of 2 or higher). The case is provided with the inlet for the liquid to be processed in the first region and the outlet for the processed liquid in the n-th region. The i-th partition plate (here, i is an integer from 1 to n−1) is provided with the inlet for the liquid to be processed in the (i+1)-th region, the inlet serving also as the outlet for the liquid to be processed in the i-th region. When X represents a length of a region in the length direction of the hollow fiber membranes, the inlet for the liquid to be processed is formed in a range from an end of the region on the upstream side to ⅓×X on the downstream side in the flowing direction of the liquid to be processed, and the outlet for the liquid to be processed is formed in a range from the end of the region on the downstream side to ⅓×X on the upstream side in the flowing direction of the liquid to be processed, and the hollow fiber membrane module is not limited to the hollow fiber membrane modules 10 of the first to sixth embodiments of examples illustrated in the drawings.

For example, the hollow fiber membrane module may include three or more partition plates, and the first space may be divided into four or more regions.

It is preferable that the hollow fiber membrane bundle have the same number of hollow fiber membranes in the regions, and the number of hollow fiber membranes may be different between the regions.

The hollow fiber membrane module may have a configuration in which the fixation part is detachably provided, and a hollow fiber membrane element formed by the hollow fiber membrane bundle and the fixation part is replaceable.

The hollow fiber membrane module may be formed by connecting a plurality of hollow fiber membrane modules 10 of one or more types selected from the group consisting of the first to sixth embodiments of examples described in the drawings, in series and/or in parallel.

The hollow fiber membrane bundle may have a configuration in which the first opening end portions of the hollow fiber membranes become the free ends in a state of being individually blocked, and the second opening end portions of the hollow fiber membranes are buried in the fixation part in a state of maintaining the openings thereof.

The hollow fiber membrane bundle may not have the restriction fiber string or may have two or more restriction fiber strings.

One or both of the inlet for the liquid to be processed and the outlet for the processed liquid of the case may be formed in the head portion of the case main body.

A plurality of inlets for the liquid to be processed, outlets for the processed liquid, and gas inlets/outlets may be formed for one case.

A plurality of inlets for the liquid to be processed, which also serve as the outlets for the liquid to be processed, may be formed for one partition plate.

<<Ink Jet Printer>>

<First Embodiment>

Figure 8:
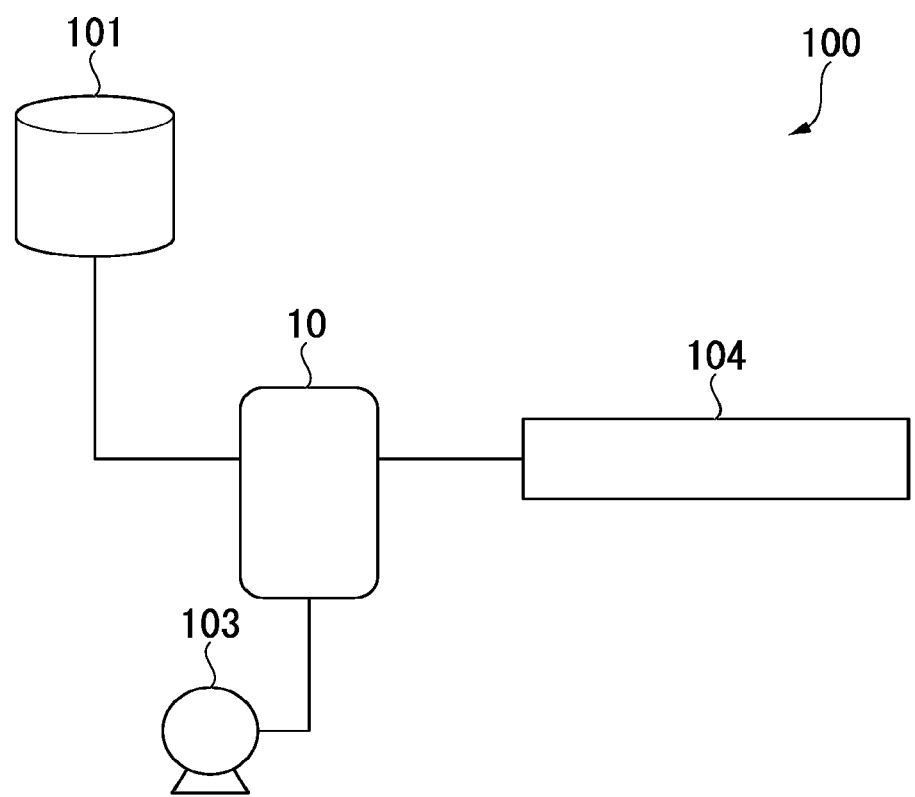
FIG. 8 is a schematic diagram illustrating a first embodiment of an ink jet printer of the invention.

FIG. 8 is a schematic diagram illustrating a first embodiment of an ink jet printer of the invention.

An ink jet printer 100 includes the hollow fiber membrane module 10 from a printing ink container 101, pressure reducing means 103, and a print head 104.

Ink is supplied from the printing ink container 101 that stores the ink to the hollow fiber membrane module 10 in which the ink is degassed. In this case, the hollow fiber membrane module 10 is connected to the pressure reducing means 103 such as a vacuum pump, and thereby the ink is degassed. The ink subjected to a degassing process is supplied to the print head 104, and printing is performed.

<Second Embodiment>

Figure 9:
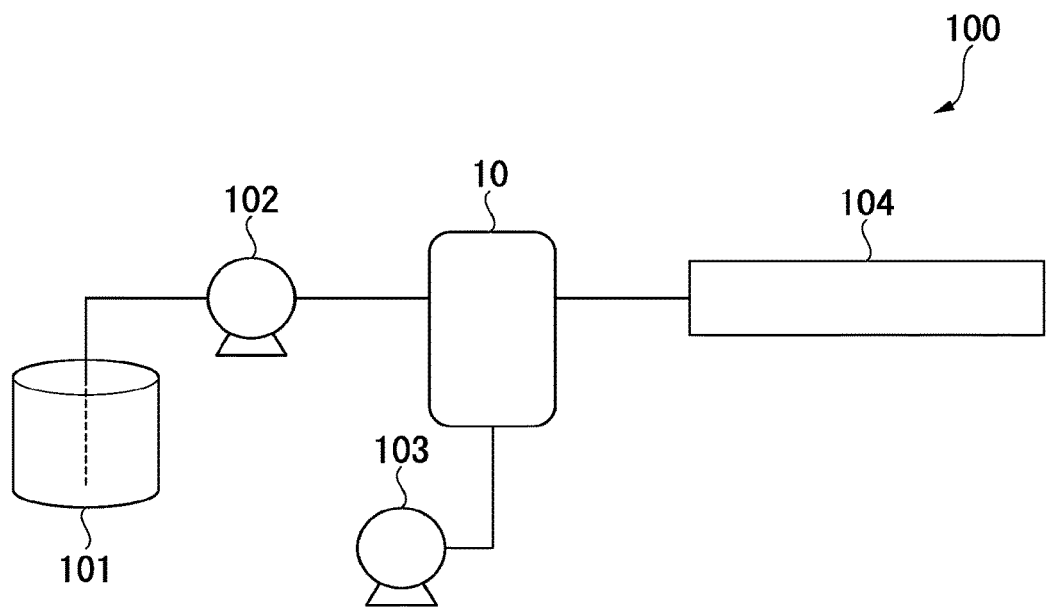
FIG. 9 is a schematic diagram illustrating a second embodiment of the ink jet printer of the invention.

FIG. 9 is a schematic diagram illustrating a second embodiment of the ink jet printer of the invention.

Differences between the ink jet printer 100 of the second embodiment and the ink jet printer of the first embodiment are as follows.

Liquid feeding means 102 is provided between the printing ink container 101 and the hollow fiber membrane module 10.

The liquid feeding means 102 is provided to suction the ink in the printing ink container 101 and to cause the ink to be easily supplied to the hollow fiber membrane module 10. An example of the liquid feeding means 102 includes a tube pump. In addition, an installation position of the liquid feeding means 102 may be between the hollow fiber membrane module 10 and the print head 104.

<Other Embodiments>

Note that the ink jet printer of the invention may include the printing ink container, the print head, the pressure reducing means, and the hollow fiber membrane module and is not limited to the ink jet printer 100 of the embodiments in FIGS. 8 and 9.

For example, the ink jet printer may have the plurality of hollow fiber membrane modules of the invention.

The liquid feeding means may be connected only to the printing ink container or may be a squeeze pump in this case.

EXAMPLES

Hereinafter, the invention will be more specifically described with Examples; however, the invention is not limited thereto.

(Dissolved-Oxygen Removing Rate)

The dissolved-oxygen removing rate was obtained from the following equation.

$$\text{Dissolved-oxygen removing rate} = ((Ma - Mb)/Ma) \times 100$$

Here, Ma represents an amount of dissolved oxygen per unit volume of the liquid to be processed, which is supplied into the hollow fiber membrane module 10 from the inlet 30a for the liquid to be processed, and Mb represents an amount of dissolved oxygen per unit volume of the processed liquid which is discharged from the outlet 30b for the processed liquid. The amounts of dissolved oxygen were measured by using a diaphragm-type dissolved-oxygen meter.

Example 1

The hollow fiber membrane module 10 illustrated in FIG. 1 was prepared.

Composite hollow fiber membranes having a three-layer structure (manufactured by Mitsubishi Chemical Corporation, Outer Diameter: 200 μm) were used as the hollow fiber membranes 22.

8,320 hollow fiber membranes 22 were used, an effective length for one hollow fiber membrane 22 was 65 mm, the filling rate of the hollow fiber membranes 22 in the case main body 32 was 31% by sectional area, and an effective membrane area of the hollow fiber membrane bundle 20 was 0.34 m².

A box-shaped polypropylene case was used as the case 30. Regarding outer dimensions of the case 30 (excluding the inlet 30a for the liquid to be processed, the outlet 30b for the processed liquid, and the gas inlet/outlet 30c), a length thereof in the length direction of the hollow fiber membranes 22 was 50 mm, a width thereof in the direction orthogonal to the length direction of the hollow fiber membranes 22 was 26 mm, a depth was 84 mm. Regarding inner dimensions of the case 30, a length thereof was 44 mm, and a width thereof was 20 mm. The inlet 30a for the liquid to be processed and the outlet 30b for the processed liquid were formed in a range from the bottom portion 32a of the case main body 32 to 20 mm.

Epoxy resin was used as the potting material for forming the fixation part 40. A length of the fixation part 40 in the length direction of the hollow fiber membranes 22 was 10 mm.

The partition plate 50 was integrally provided in the case main body 32. A thickness of the partition plate 50 was 3 mm. The inlet 50a for the liquid to be processed, which also served as the outlet 50b for the liquid to be processed, was formed in a range from a boundary of the fixation part 40 to 10 mm.

Tap water having a temperature of 25° C. was used as the liquid to be processed, and degassing was performed from the liquid to be processed.

A flow volume of the liquid to be processed was 300 ml/min.

The dissolved-oxygen removing rate from the liquid to be processed was 60%.

Comparative Example 1

Figure 10:
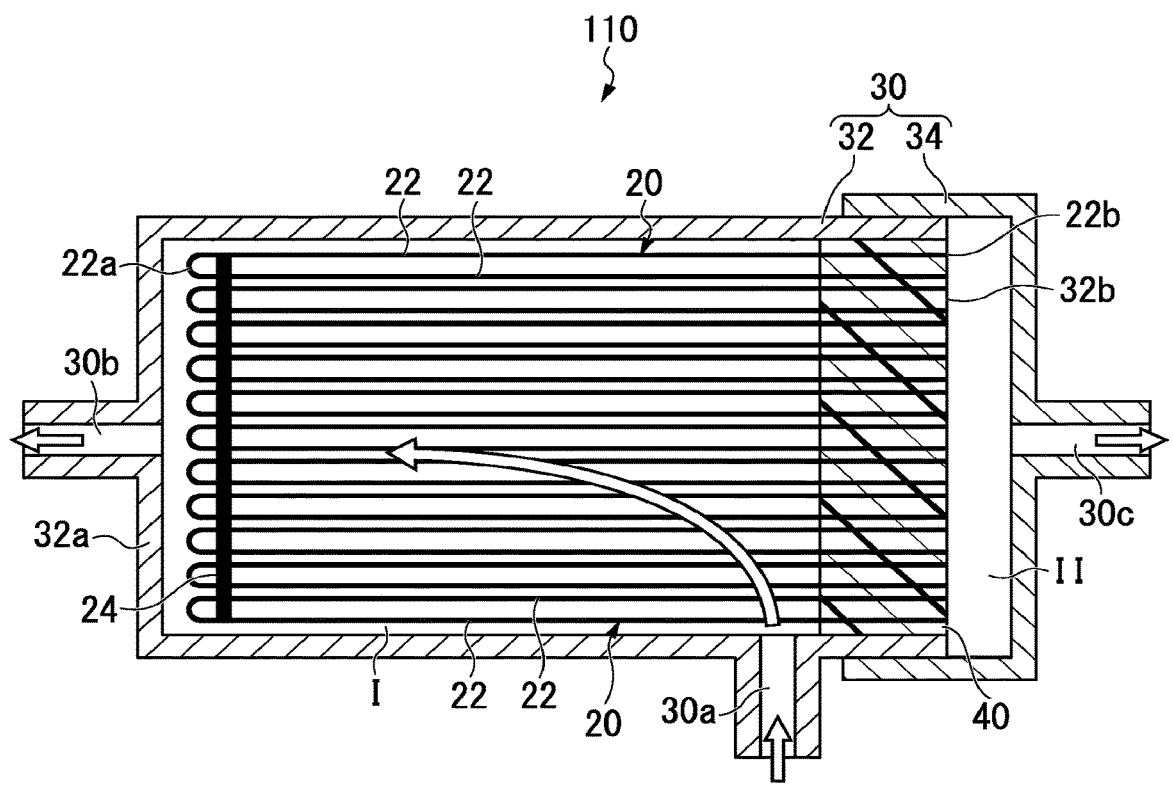
FIG. 10 is a sectional view illustrating a hollow fiber membrane module of Comparative Examples 1 and 2.

A hollow fiber membrane module 110 illustrated in FIG. 10 was prepared.

Differences between the hollow fiber membrane module 110 of Comparative Example 1 and the hollow fiber membrane module 10 of Example 1 are as follows.

The case 30 has a circular cylinder shape.

The case main body 32 is provided with the inlet 30a for the liquid to be processed, which communicates with the inside of the case main body 32, at a position of a side wall which is close to the fixation part 40, and the outlet 30b for the processed liquid, which communicates with the inside of the case main body 32, at the center of the bottom portion 32a of the case main body 32.

The partition plate 50 is not provided.

Composite hollow fiber membranes having a three-layer structure (manufactured by Mitsubishi Chemical Corporation, Outer Diameter: 200 μm) were used as the hollow fiber membranes 22.

8,320 hollow fiber membranes 22 were used, an effective length for one hollow fiber membrane 22 was 65 mm, the filling rate of the hollow fiber membranes 22 in the case main body 32 was 33% by sectional area, and an effective membrane area of the hollow fiber membrane bundle 20 was 0.34 m².

A circular cylinder-shaped polypropylene case was used as the case 30. Regarding outer dimensions of the case 30 (excluding the inlet 30a for the liquid to be processed, the outlet 30b for the processed liquid, and the gas inlet/outlet 30c), a length thereof in the length direction of the hollow fiber membranes 22 was 90 mm, an outer diameter was 40 mm. Regarding inner dimensions of the case 30, a length thereof was 76 mm, and an inner diameter thereof was 32 mm.

Epoxy resin was used as the potting material for forming the fixation part 40. A length of the fixation part 40 in the length direction of the hollow fiber membranes 22 was 15 mm.

Tap water having a temperature of 25° C. was used as the liquid to be processed, and degassing was performed from the liquid to be processed at the same water pressure as that in Example 1.

A flow volume of the liquid to be processed was 200 mL/min.

The dissolved-oxygen removing rate from the liquid to be processed was 50%.

In Comparative Example 1, since the liquid to be processed flowed in the obliquely traversing direction of the hollow fiber membranes 22, the pressure loss increased, and thus the flow volume of the liquid to be processed more decreased than in Example 1.

In Comparative Example 1, since the short pass was formed, the flow path length was shortened, and the contact time with the hollow fiber membranes 22 was shortened. In addition, since the short pass was formed, and the dead space, in which sufficient liquid to be processed does not flow, was also formed, it was not possible to effectively use the hollow fiber membranes 22. Therefore, it was not possible to perform sufficient degassing from the liquid to be processed further than in Example 1.

Example 2

The hollow fiber membrane module 10 illustrated in FIG. 1 was prepared.

Composite hollow fiber membranes having a three-layer structure (manufactured by Mitsubishi Chemical Corporation, Trade Name: MHF130EPE) were used as the hollow fiber membranes 22.

A bottomed circular cylindrical case main body 32 having a length of 150 mm and an inner diameter of 52 mm was used, 17,280 hollow fiber membranes 22 were inserted, and the hollow fiber membrane module 10 having an effective membrane area of 1.3 m² was prepared. In this case, the partition plate 50 having a thickness of 1 mm was inserted into the inside of the bottomed circular cylindrical case main body 32. The partition plate was provided with the elliptical inlet and outlet 50*a* and 50*b* for the liquid to be processed, which had a sectional area of 3 cm² in a range from the boundary of the fixation part 40 to 5 mm. In addition, an average value of sectional areas of spaces divided by the partition plate 50 was 10 cm². The case main body 32 was provided with the inlet 30*a* for the liquid to be processed and the outlet 30*b* for the processed liquid in a range from the head portion 32*a* of the case main body 32 to 20 mm.

Note that the filling rate of the hollow fiber membranes 22 in the case main body 32 was 27% by area. Epoxy resin was used as a potting agent for forming the fixation part 40.

Figure 12:
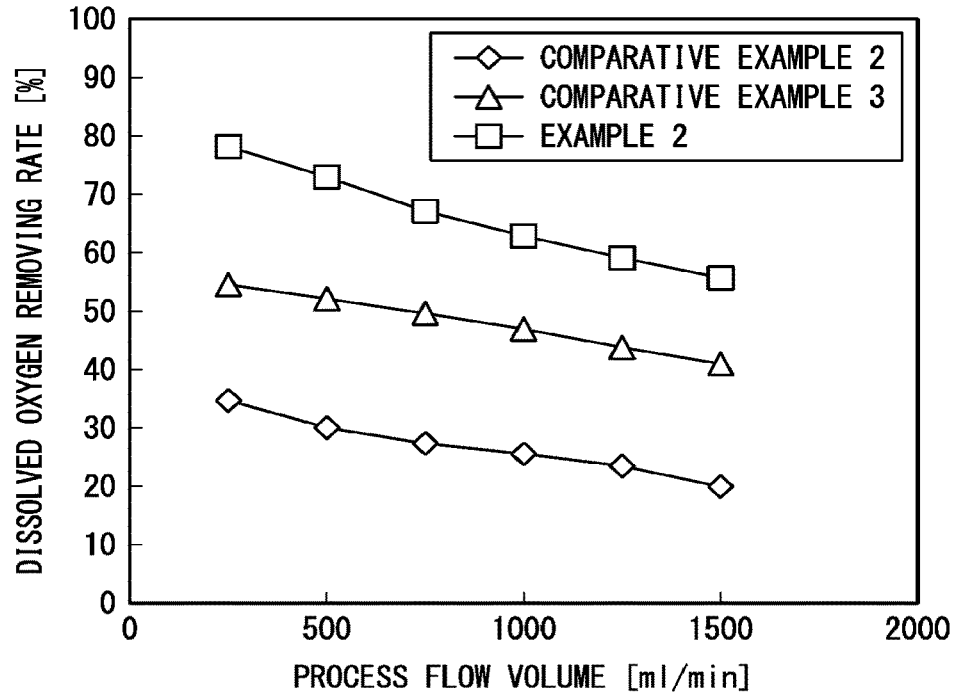
FIG. 12 is a graph indicating a relationship between a process flow volume and a dissolved-oxygen removing rate in a case where hollow fiber membrane modules of Example 2 and Comparative Examples 2 and 3 are used in a vertically installed manner.
Figure 13:
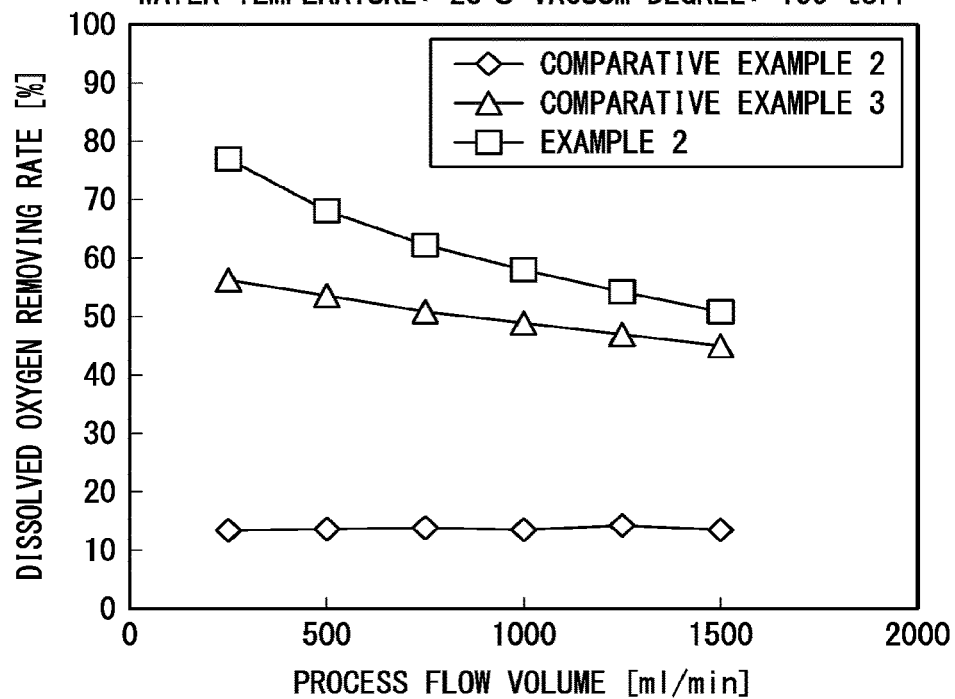
FIG. 13 is a graph indicating a relationship between a process flow volume and a dissolved-oxygen removing rate in a case where the hollow fiber membrane modules of Example 2 and Comparative Examples 2 and 3 are used in a horizontally installed manner.

While tap water having a temperature of 25° C. flowed as the liquid to be processed with a flow rate being changed, a pressure was reduced to −88 kPa by using a vacuum pump from the gas inlet/outlet 30*c*, and a dissolved-oxygen concentration of the processed liquid was measured. The results are illustrated in FIGS. 12 and 13.

Comparative Example 2

The hollow fiber membrane module 110 illustrated in FIG. 10 was prepared.

Differences between the hollow fiber membrane module 110 of Comparative Example 2 and the hollow fiber membrane module 10 of Example 2 are as follows.

The case main body 32 is provided with the inlet 30*a* for the liquid to be processed, which communicates with the inside of the case main body 32, at a position of a side wall which is close to the fixation part 40, and the outlet 30*b* for the processed liquid, which communicates with the inside of the case main body 32, at the center of the bottom portion 32*a* of the case main body 32.

The partition plate 50 is not provided.

Composite hollow fiber membranes having a three-layer structure (manufactured by Mitsubishi Chemical Corporation, Trade Name: MHF130EPE) were used as the hollow fiber membranes 22.

A bottomed circular cylindrical case main body 32 having a length of 150 mm and an inner diameter of 52 mm was prepared. 19,200 hollow fiber membranes 22 were inserted into the inside of the case main body 32, and the hollow fiber membrane module 110 having an effective membrane area of 1.45 m² was prepared.

While tap water having a temperature of 25° C. flowed as the liquid to be processed with a flow rate being changed, a pressure was reduced to −88 kPa by using a vacuum pump from the gas inlet/outlet 30*c*, and a dissolved-oxygen concentration of the processed liquid was measured. The results are illustrated in FIGS. 12 and 13.

Comparative Example 3

Figure 11:
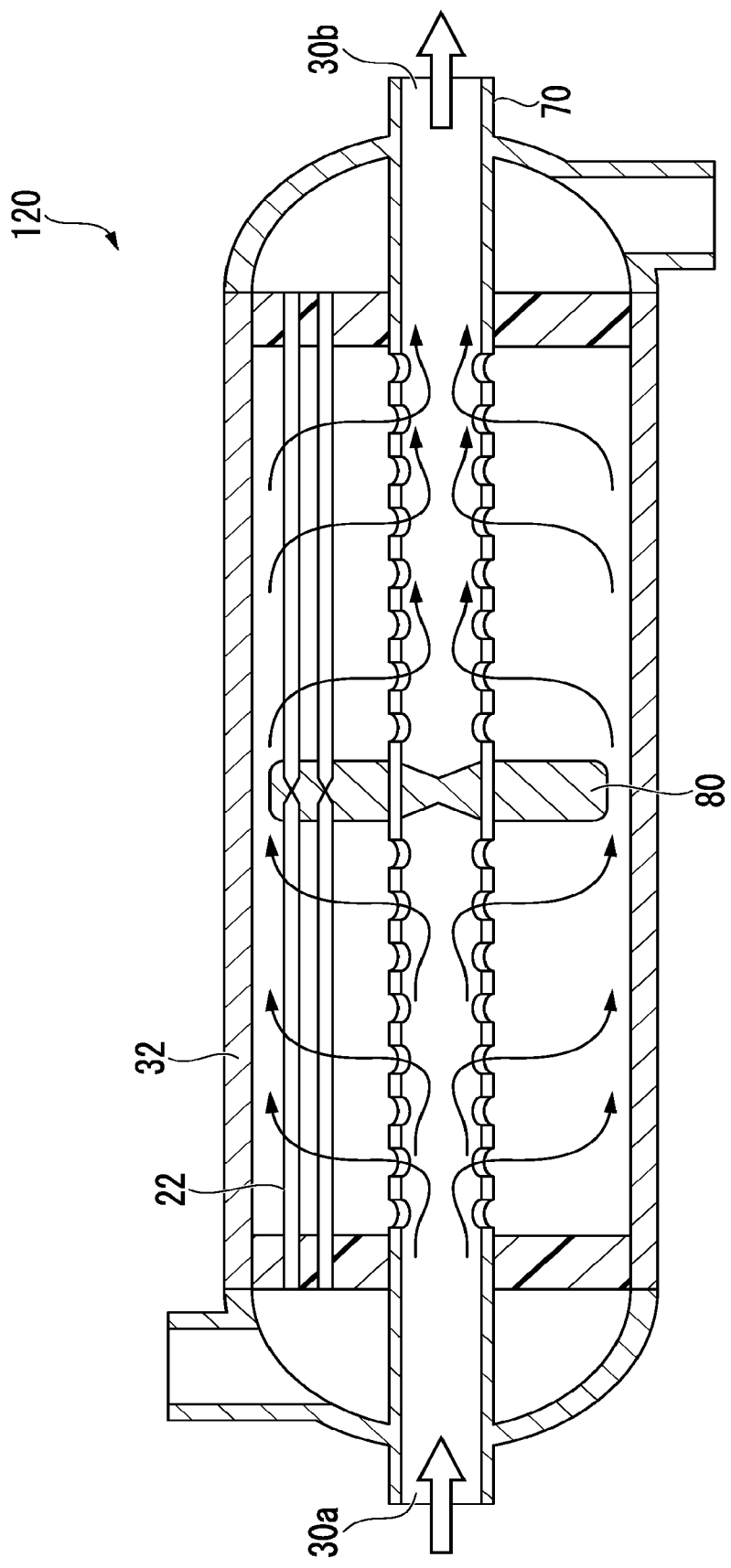
FIG. 11 is a sectional view illustrating a hollow fiber membrane module of Comparative Example 3.

A hollow fiber membrane module 120 illustrated in FIG. 11 was prepared.

Differences between the hollow fiber membrane module 120 of Comparative Example 3 and the hollow fiber membrane module 10 of Example 2 are as follows.

A tube 70 having holes at the center is provided in the case main body 32, and the liquid to be processed is supplied into the hollow fiber membrane module 120 from the inlet 30*a* for the liquid to be processed in the tube 70. The hollow fiber membrane 22 is divided into two portions by a baffle 80 perpendicular to the length direction. The liquid to be processed, which has been processed by the hollow fiber membranes 22 on the side of the inlet 30*a* for the liquid to be processed, is moved around the baffle 80 so as to be processed by the hollow fiber membranes 22 on the side of the outlet 30*b* for the processed liquid. Then, the liquid to be processed returns to an inside of the tube 70 and is discharged from the outlet 30*b* for the processed liquid.

The partition plate 50 is not provided.

Composite hollow fiber membranes having a three-layer structure (manufactured by Mitsubishi Chemical Corporation, Trade Name: MHF130EPE) were used as the hollow fiber membranes 22.

A circular cylindrical case main body 32 having a length of 220 mm and an inner diameter of 55 mm was prepared. 15,360 hollow fiber membranes 22 were inserted into the inside of the case main body 32, and the hollow fiber membrane module 120 having an effective membrane area of 1.3 m² was prepared.

The tube 70 with a plurality of holes, which has an inner diameter of 9 mm and an outer diameter of 13 mm, is inserted at the center of the case main body 32, and the baffle 80 is further provided at the center of the longitudinal direction.

While tap water having a temperature of 25° C. flowed as the liquid to be processed with a flow rate being changed, a pressure was reduced to −88 kPa by using a vacuum pump from the gas inlet/outlet 30*c*, and a dissolved-oxygen concentration of the processed liquid was measured. The results are illustrated in FIGS. 12 and 13.

FIG. 12 is a graph indicating a relationship between a process flow volume and a dissolved-oxygen removing rate in a case where hollow fiber membrane modules of Example 2 and Comparative Examples 2 and 3 are used in a vertically installed manner. In this case, the gas inlet/outlet 30*c* of Example 2 and Comparative Example 2 was disposed downward.

FIG. 13 is a graph indicating a relationship between a process flow volume and a dissolved-oxygen removing rate in a case where the hollow fiber membrane modules of Example 2 and Comparative Examples 2 and 3 are used in a horizontally installed manner. In this case, the inlet 30*a* for the liquid to be processed of Example 2 and Comparative Example 2 was disposed downward.

In Comparative Examples 2 and 3, the short pass was formed, and thus it was not possible to use the hollow fiber membranes 22 effectively. Therefore, it was not possible to perform sufficient degassing from the liquid to be processed further than in Example 2.

On the other hand, in Example 2 to which the invention of this application is applied, sufficient degassing performance was exhibited even at a high flow volume. In addition, although the effective membrane area was smaller than that in Comparative Example 2, better degassing performance was exhibited than in Comparative Example 2, and thus the hollow fiber membrane module of the invention of this application was determined to have sufficient degassing performance in a compact design. In addition, regardless of the vertical installation or the horizontal installation, the hollow fiber membrane module was determined to have sufficient degassing performance.

INDUSTRIAL APPLICABILITY

The hollow fiber membrane module of the invention is useful as a degassing device that is provided in an inkjet ejecting apparatus such as an ink jet printer or a color filter manufacturing apparatus; or a gas supply device that is provided in a carbonated water producing apparatus, a medical water producing apparatus, or the like.

EXPLANATIONS OF LETTERS OR NUMERALS

10 HOLLOW FIBER MEMBRANE MODULE
20 HOLLOW FIBER MEMBRANE BUNDLE
22 HOLLOW FIBER MEMBRANE
22a BENDING PORTION
22b OPENING END PORTION
22d FIRST OPENING END PORTION
22e SECOND OPENING END PORTION
24 RESTRICTION FIBER STRING
30 CASE
30a INLET FOR LIQUID TO BE PROCESSED
30b OUTLET FOR PROCESSED LIQUID
30c GAS INLET/OUTLET
30d FIRST GAS INLET/OUTLET
30e SECOND GAS INLET/OUTLET
32 CASE MAIN BODY
32a HEAD PORTION
32b CASE OPENING
32c1 FIRST CASE OPENING
32e SECOND CASE OPENING
34 LID BODY
36 FIRST LID BODY
38 SECOND LID BODY
40 FIXATION PART
42 FIRST FIXATION PART
44 SECOND FIXATION PART
50 PARTITION PLATE
50a INLET FOR LIQUID TO BE PROCESSED
50b OUTLET FOR LIQUID TO BE PROCESSED
52 FIRST PARTITION PLATE
52a INLET FOR LIQUID TO BE PROCESSED
52b OUTLET FOR LIQUID TO BE PROCESSED
54 SECOND PARTITION PLATE
54a INLET FOR LIQUID TO BE PROCESSED
54b OUTLET FOR LIQUID TO BE PROCESSED
60 BLOCKING PORTION
70 TUBE
80 BAFFLE
100 INK JET PRINTER
101 PRINTING INK CONTAINER
102 LIQUID FEEDING MEANS
103 PRESSURE REDUCING MEANS
104 PRINT HEAD
110 HOLLOW FIBER MEMBRANE MODULE
120 HOLLOW FIBER MEMBRANE MODULE
I FIRST SPACE
II SECOND SPACE
IIa SECOND SPACE
IIb SECOND SPACE
A FIRST REGION
A1 UPSTREAM END
A2 DOWNSTREAM END
B SECOND REGION
B1 UPSTREAM END
B2 DOWNSTREAM END
C THIRD REGION
C1 UPSTREAM END
C2 DOWNSTREAM END
X LENGTH OF REGION

The invention claimed is:

1. A hollow fiber membrane module for removing a gas from a liquid to be processed and supplying a gas to the liquid to be processed, the module comprising:

a hollow fiber membrane bundle formed by a plurality of arranged hollow fiber membranes;
a case in which the hollow fiber membrane bundle is housed;
a fixation part that affixes an opening end portion of each of the hollow fiber membranes in the case in a state of maintaining an opening and partitions a space in the case in a liquid-tight manner into a first space on an outer side of the hollow fiber membranes and a second space that communicates with an inner side of each of the hollow fiber membranes; and
(n−1) partition plates provided in a length direction of the hollow fiber membranes so as to divide the first space into n regions (here, n is an integer of 2 or higher),
wherein:
the case is provided with an inlet for the liquid to be processed in the first region and an outlet for a processed liquid in the n-th region;
the i-th partition plate (here, i is an integer from 1 to n−1) is provided with an inlet for the liquid to be processed in the (i+1)-th region, the inlet serving also as an outlet for the liquid to be processed in the i-th region; and
when X represents a length of each of the regions in the length direction of the hollow fiber membranes, the inlet for the liquid to be processed is formed in a range from an end of the region on an upstream side to $\frac{1}{3} \times X$ on a downstream side in a flowing direction of the liquid to be processed, and the outlet for the liquid to be processed and the outlet for the processed liquid are formed in a range from the end of the region on the downstream side to $\frac{1}{3} \times X$ on the upstream side in the flowing direction of the liquid to be processed.

2. The hollow fiber membrane module according to claim 1, wherein the flowing direction of the liquid to be processed is parallel to a longitudinal direction of the hollow fiber membranes.

3. The hollow fiber membrane module according to claim 1, wherein the hollow fiber membrane bundle has an end portion that is not affixed, on an opposite side to the opening end portion.

4. The hollow fiber membrane module according to claim 1, wherein a filling rate of the hollow fiber membranes in a cross section obtained by being cut perpendicularly to the longitudinal direction of the hollow fiber membrane bundle is 20 to 50% by area in terms of 100% by area of a sectional area of a space when the case is cut perpendicularly to the longitudinal direction.

5. The hollow fiber membrane module according to claim 1, wherein at least one selected from the group consisting of the inlet for the liquid to be processed and the outlet for the processed liquid, which are formed in the case, is formed on a side surface of the case.

6. The hollow fiber membrane module according to claim 1, further comprising:
a lid body that covers the opening of the case on a side on which the hollow fiber membrane bundle is not affixed,
wherein at least one selected from the group consisting of the inlet for the liquid to be processed and the outlet for the processed liquid is formed in the lid body.

7. The hollow fiber membrane module according to claim 1, wherein an area of the inlet for the liquid to be processed and an area of the outlet for the liquid to be processed, which are formed in the partition plate, are equal to or smaller than a sectional area obtained when a space divided and formed by the partition plate is cut perpendicularly to the longitudinal direction.

8. The hollow fiber membrane module according to claim 1, further comprising:
   a blocking portion that blocks a flow of the liquid to be processed in a gap between the hollow fiber membrane bundle and the case.

9. The hollow fiber membrane module according to claim 1, wherein the hollow fiber membrane bundle is bent into a U shape, and the hollow fiber membrane bundle has substantially the same length.

10. The hollow fiber membrane module according to claim 1, wherein the hollow fiber membrane bundle has a restriction fiber string that extends in a direction orthogonal to the length direction of the hollow fiber membranes while connecting the hollow fiber membranes.

11. The hollow fiber membrane module according to claim 1, wherein the hollow fiber membranes are combined membranes that are each provided with a homogeneous layer having gas permeability and a porous support layer which supports the homogeneous layer.

12. The hollow fiber membrane module according to claim 1, wherein an outer diameter of each of the hollow fiber membranes is 350 µm or smaller.

13. The hollow fiber membrane module according to claim 1, wherein the hollow fiber membrane has fracture strength of 0.5 N/fil or higher and fracture elongation of 50% or higher.

14. The hollow fiber membrane module according to claim 1, wherein the case has a circular cylindrical shape or an angled shape.

15. An ink jet printer comprising:
   a printing ink container;
   a print head;
   a pressure reducer; and
   a hollow fiber membrane module,
   wherein at least one hollow fiber membrane module according to claim 1 is provided at any position between the printing ink container and the print head.

16. The ink jet printer according to claim 15, further comprising:
   a liquid feeder.

* * * * *